United States Patent [19]
Frid-Nielsen

[11] Patent Number: 5,740,444
[45] Date of Patent: *Apr. 14, 1998

[54] SYMBOL BROWSING IN AN OBJECT-ORIENTED DEVELOPMENT SYSTEM

[75] Inventor: Lars Kristian Frid-Nielsen, Santa Cruz, Calif.

[73] Assignee: Borland International, Inc., Scotts Valley, Calif.

[*] Notice: The term of this patent shall not extend beyond the expiration date of Pat. No. 5,339,433.

[21] Appl. No.: 710,292

[22] Filed: Sep. 16, 1996

Related U.S. Application Data

[62] Division of Ser. No. 470,881, Jun. 6, 1995, Pat. No. 5,557,730, which is a continuation of Ser. No. 233,793, Apr. 26, 1994, Pat. No. 5,432,903, which is a division of Ser. No. 979,575, Nov. 19, 1992, Pat. No. 5,339,433.

[51] Int. Cl.$^6$ ........................................... G06F 3/00
[52] U.S. Cl. ........................... 395/705; 395/703; 345/357
[58] Field of Search .............................. 395/326–358, 395/604–606, 701–709; 345/326–358

[56] References Cited

U.S. PATENT DOCUMENTS

| | | |
|---|---|---|
| 5,095,423 | 3/1992 | Gramlich et al. ............... 395/604 |
| 5,117,349 | 5/1992 | Tirfing et al. ................... 395/604 |
| 5,129,082 | 7/1992 | Tirfing et al. ................... 395/604 |
| 5,339,433 | 8/1994 | Frid-Nielsen ............... 395/349 X |
| 5,432,903 | 7/1995 | Frid-Nielsen ................. 395/349 |
| 5,557,730 | 9/1996 | Frid-Nielsen ................. 395/349 |

*Primary Examiner*—John E. Breene
*Attorney, Agent, or Firm*—John A. Smart

[57] ABSTRACT

A system of the present invention includes a development system having a language compiler for generating application and system software from source listings. The system includes an Integrated Development Environment having a browser. Methods of the present invention include inspecting symbols (e.g., classes, objects, methods, variables, and the like) dynamically, i.e., while retaining active scope of the symbol. More particularly, the browser of the present invention directly references symbol information stored in object code or executable modules, which are generated during compilation of the source listings. In this manner, the system provides symbol information directly relevant to the context (location in source listing) the user/programmer is currently working.

15 Claims, 25 Drawing Sheets

FIG. 4A

Borland Pascal - [h:\users\smart\bp\examples\docdemos\ow\ewndtest.pas]

File  Edit  Search  Run  Compile  Tools  Options  Window  Help

```
{************************************************}
{                                                  }
{   ObjectWindows Demo                             }
{   Copyright (c) 1992 by Borland International    }
{                                                  }
{************************************************} program EWndTest;

{$R EWNDTEST.RES} uses WinTypes, WinProcs, Strings, OWindows, OStdWnds;

const
  cm_SendText = 399;

type
  TTestApplication = object(TApplication)
    procedure InitMainWindow; virtual;
  end;

PTestWindow = ^TTestWindow;
  TTestWindow = object(TEditWindow)
    constructor Init(AParent: PWindowsObject; ATitle: PChar);
    procedure HandleSend(var Msg: TMessage);
      virtual cm_First + cm_SendText;
  end;

{--------TTestWindow methods--------------------------}
```

1:1       Insert

SYMBOL BROWSING IN AN OBJECT-ORIENTED DEVELOPMENT SYSTEM

The present application is a division of application Ser. No. 08/470,881, filed Jun. 6, 1995, now U.S. Pat. No. 5,557,730, which is a continuation of application Ser. No. 08/233,793, filed Apr. 26, 1994, now U.S. Pat. No. 5,432,903, which is a division of application Ser. No. 07/979,575, filed Nov. 19, 1992, now U.S. Pat. No. 5,339,433.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of computer systems and, more particularly, to systems and methods for compiling source programs, particularly object-oriented ones, into system and application programs.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programing languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program which is written in the high-level language is called the "source code" or source program. The low-level or machine language, on the other hand, comprises "object code." Once created, object code (e.g., .obj file) is a separate program in its own right—it includes instructions which may be executed by the target microprocessor. In practice, however, the object code is usually first linked (i.e., combined) with other object code or libraries, which include standard routines.

Compilers are fundamental to modern computing. Translating human-oriented programming languages into computer-oriented machine languages, compilers allow computer programmers to ignore the machine-dependent details of machine language. Instead of focusing on the register set or memory architecture of a particular computer, for instance, one may simply concentrate on solving the problem at hand. Thus, high-level languages are "portable," that is, they afford a level of abstract which permits a single program to be implemented on several different machines, including ones of vastly different architecture.

Of particular interest to the present invention are compiler and development tools designed for graphic user interfaces (GUIs), such as Microsoft® Windows and Apple® Macintosh System 7. Employing an intuitive "desktop metaphor", including such familiar objects as file cabinets, folders, and trash cans, these system have largely displaced awkward command-line systems, such as MS-DOS.

While GUIs are easy for the users to use, they are by no means simple to program. Instead, the intuitive user interface belies an extremely complex system, one having hundreds of API (Application Programming Interface) calls. A simple "Hello World" Microsoft Windows program written in C, for example, requires a hundred or so lines of source code. Besides the sheer bulk of the API, however, the programmer faces an even greater challenge—that of understanding the intricacies of a message-driven environment.

At the heart of a GUI such as MS-Windows is a message or event-driven system, one which requires a shift in the way programmers normally think about computer programs. Traditionally, programmers have developed programs consisting of sequential procedures or modes. As such these programs have a well-defined beginning, middle, and end, with little or no flexibility for the user to vary this pre-determined sequence.

A GUI, in contrast, promotes a "modeless" model, that is, one not tied to any particular predefined sequence of modes. To accomplish this, these systems introduce the notion of "events" and "messages." An event is any activity of interest, such as the press of key on a keyboard or movement of a pointing (mouse) device. The system responds to an event by sending a message to the currently executing application(s). In MS-Windows, for instance, when the user clicks a left mouse button, a WM_LBUTTONDOWN message is sent. Similarly, pressing a keyboard key causes a WM_KEYDOWN message to be sent. If the user selects an item from a menu, a WM_COMMAND message is sent. Other messages correspond to manipulating scroll bars (WM_HSCROLL, WM_VSCROLL), resizing windows (WM_SIZE), redrawing windows (WM_PAINT), closing windows (WM_CLOSE), and so on.

There are so many messages which may be generated in fact that managing them has become quite a choir in itself. Using C, for example, the programmer writes an event loop that checks to see whether there any messages which must be responded to. In practice, however, this entails writing a gargantuan case statement that dispatches messages to various functions. And in a Windows program of any complexity, this case statement often spans several pages, making development and maintenance of the program an exceedingly difficult task. Thus, there is much interest in devising tools which reduce or eliminate the complexity of GUI development.

Although not an object-oriented system itself, Windows possesses characteristics which facilitate application development with object-oriented programming (OOP) methodologies. Most notably, Windows is an event-driven or message-based system; its messages are analogous to the OOP concept of sending messages to objects. Combining the event-driven nature of Windows with an OOP language creates a single, more consistent development model. Just as a high-level language frees a programmer from the need to understand machine-level details, an OOP language, by hiding Windows details, eases the task of learning an event-driven architecture.

While the move from procedural to object-oriented programming has facilitated the creation and maintenance of GUI application software, present day development tools have not kept pace. More particularly, application development in an object-oriented programming language, such as C++, brings with it a host of new complexities which the application developer must somehow manage. For instance, a C++program of even modest complexities requires the creation and maintenance of immense class hierarchies—sophisticated data structures with complex interdependencies. Thus, while a programmer may encapsulate the complexities of a GUI application in an object-oriented framework, the complexities of such a framework, in turn, must be managed with tools which are inadequate for object-oriented development.

What is needed are system and methods for simplifying the creation and management of object-oriented applications, particularly those with complex class hierarchies. More particularly, such a system should provide the developer with the ability to easily manage the complex data structures attendant to object-oriented development. The present invention fulfills this and other needs.

SUMMARY OF THE INVENTION

The present invention recognizes a need for providing an object-oriented development environment with tools for managing complex data structures and hierarchies. A system of the present invention includes a development environment having a compiler, a linker, and an interface. Through the interface (either command-line or UI driven), an application or system developer supplies source code listings to the compiler. Additional source and/or programs are provided by standard libraries and class libraries. From the source listings (including header and include files), the compiler generates object modules. In turn, these may be linked with other object modules or libraries to generate program executable by a target processor.

The interface of the present invention includes a browser module for providing on-demand inspection of symbols which comprise the source listings. In a preferred embodiment, "browsing information" (i.e., symbols and their data) is optionally stored in object code modes (or executable programs if linked) upon generation by the compiler. A browsing window is provided for on-demand inspection of symbols in the source listing, whereby reference is made to the browsing information stored in the executable program corresponding to the source listings. Since browsing information is stored and later referenced directly from code modules themselves, the browser of the present invention provides information (e.g., visibility or "scope") which is appropriate for the context (exactly where in the source code) a programmer is currently working.

The browsing module of the present invention also includes a filter interface for managing the display of complex and sometimes voluminous information. In particular, a user interface component resembling a familiar DIP (dual-inline package) switch is displayed on the screen for setting various filters. In this manner, the user may easily toggle filters as desired for a particular view of the information.

BRIEF DESCRIPTION OF THE DRAWINGS

FIGS. 4A–B are screen bitmaps illustrating an integrated development environment (IDE) of the system of the present invention.

FIG. 5 is a screen bitmap illustrating a help dialog which is invoked in response to a request for information about a symbol in the IDE of FIG. 4.

FIGS. 6A–B are screen bitmaps illustrating the implementation of a browser module of the present invention, which is displayed in response to a user request for information about a particular symbol.

FIGS. 7G–N are screen bitmaps illustrating inspection of a class hierarchy for application software using the browsing module of the present invention.

DETAILED DESCRIPTION OF A PREFERRED EMBODIMENT

General Architecture

A. System Hardware

Figure 1A:
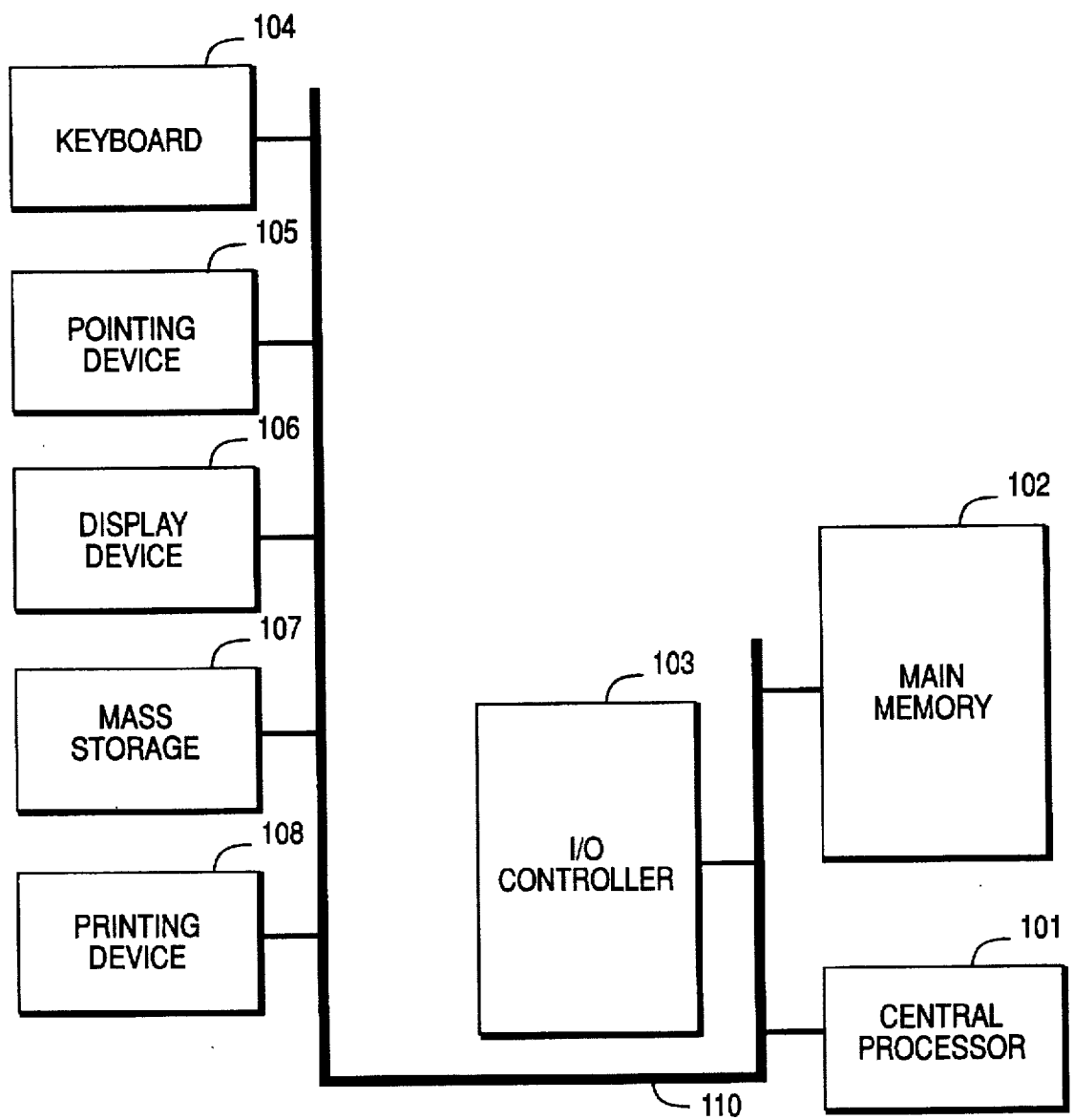
FIG. 1A is a block diagram of a computer system in which the present invention may be embodied.

The present invention may be embodied on a computer system such as the system 100 of FIG. 1, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be provided with the system 100 as desired. As shown, the various components of the system 100 communicate through a system bus 110 or similar architecture.

B. System Software

The following description will focus on the presently preferred embodiments of the present invention, which are operative in the Microsoft Windows environment. The present invention, however, is not limited to any particular application or any particular environment. Instead, those skilled in the art will find that the system and methods of the present invention may be advantageously applied to a variety of system and platforms, including Macintosh, UNIX, NextStep, and the like. Moreover, while the present invention is particularly useful for object-oriented systems, those skilled in the art will appreciate that the system and methodology of the present invention may also be employed to advantage in procedural environments (including C, BASIC, assembler, and the like) as well. Therefore, the description of the exemplary embodiments which follows is for purposes of illustration and not limitation.

Figure 1B:
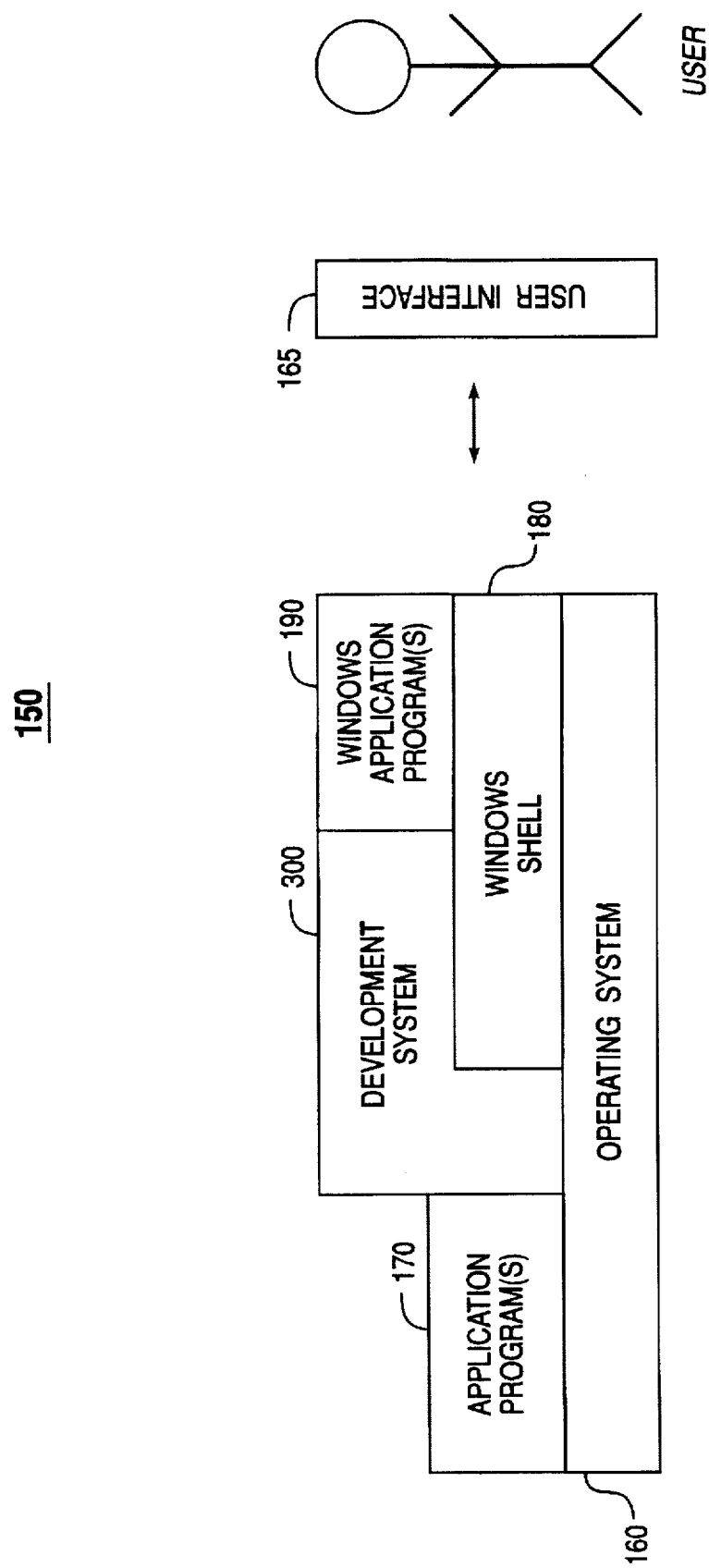
FIG. 1B is a block diagram of a software system for controlling the operation of the system of FIG. 1A, the software system including an object-oriented development system of the present invention.

Illustrated in FIG. 1B, a computer software system 150 is provided for programing the operation of the computer system 100. Software system 150, which is stored in system memory 102 and on disk memory 107, includes a kernel or operating system 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, communicate with the user through an interface 165 for receiving commands and data and displaying results and other useful information.

Software system 150 also includes a development system 200 of the present invention for developing system and application programs. As shown, the development system 200 includes components which interface with the system 100 through windows shell 180, as well as components which interface directly through OS 160.

In a preferred embodiment, the system 100 is an IBM-compatible personal computer, available from a variety of vendors (including IBM of Armonk, N.Y.). Operating system 160 is MS-DOS and shell 180 is Microsoft Windows, both of which are available from Microsoft Corporation of Redmond, Wash.; alternatively, the system 100 may be implemented in other platforms, including Macintosh, UNIX, and the like. In an exemplary embodiment, development system 200 includes Borland Pascal 7.0; alternatively, system 200 includes Borland C++, version 3.1. Both are available from Borland International of Scotts Valley, Calif. Application software 170, 190, on the other hand, can be any one of a variety of software applications, including word processing, database, spreadsheet, text editors, and the like.

Event-driven Windows Development

A. Windows interface

As shown in FIG. 1C, the system 100 typically presents UI 165 as a windowing interface or workspace 200. Windows interface 200 is a rectangular, graphical user interface (GUI) providing one or more windows 201 for display on screen 106; additional window objects may be displayed in various sizes and formats (e.g., tiled or cascaded), as desired. At the top of window 201 is a menu bar 210 with a plurality of user-command choices, each of which may invoke additional submenus and software tools for use with application objects. Window 201 also includes a client area 220 for displaying and manipulating screen objects, such as graphic object 221 and text object 222. In essence, the client area is a workspace or viewport for the user to interact with data objects which reside in the memory 102 of the computer system 100.

Windows interface 200 includes a screen cursor or pointer 225 for selecting and otherwise invoking screen objects of interest. In response to user movement signals from the pointing device 105, the cursor 225 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 201 may be closed, resized, or scrolled by "clicking on" (selecting) screen components 212, 214/5, and 217/8, respectively. Keystroke equivalents, including keyboard accelerators or "hot keys", are provided for performing these and other user operations through keyboard 104.

B. Event-driven Architecture and "Messages"

Underlying the windows interface is a message or event-driven architecture. This model is perhaps best described by contrasting its operation with that of a modal or sequential architecture which has been traditionally employed. In this manner, the reader may appreciate the added flexibility as well as complexity of an event-driven system.

Figure 2A:
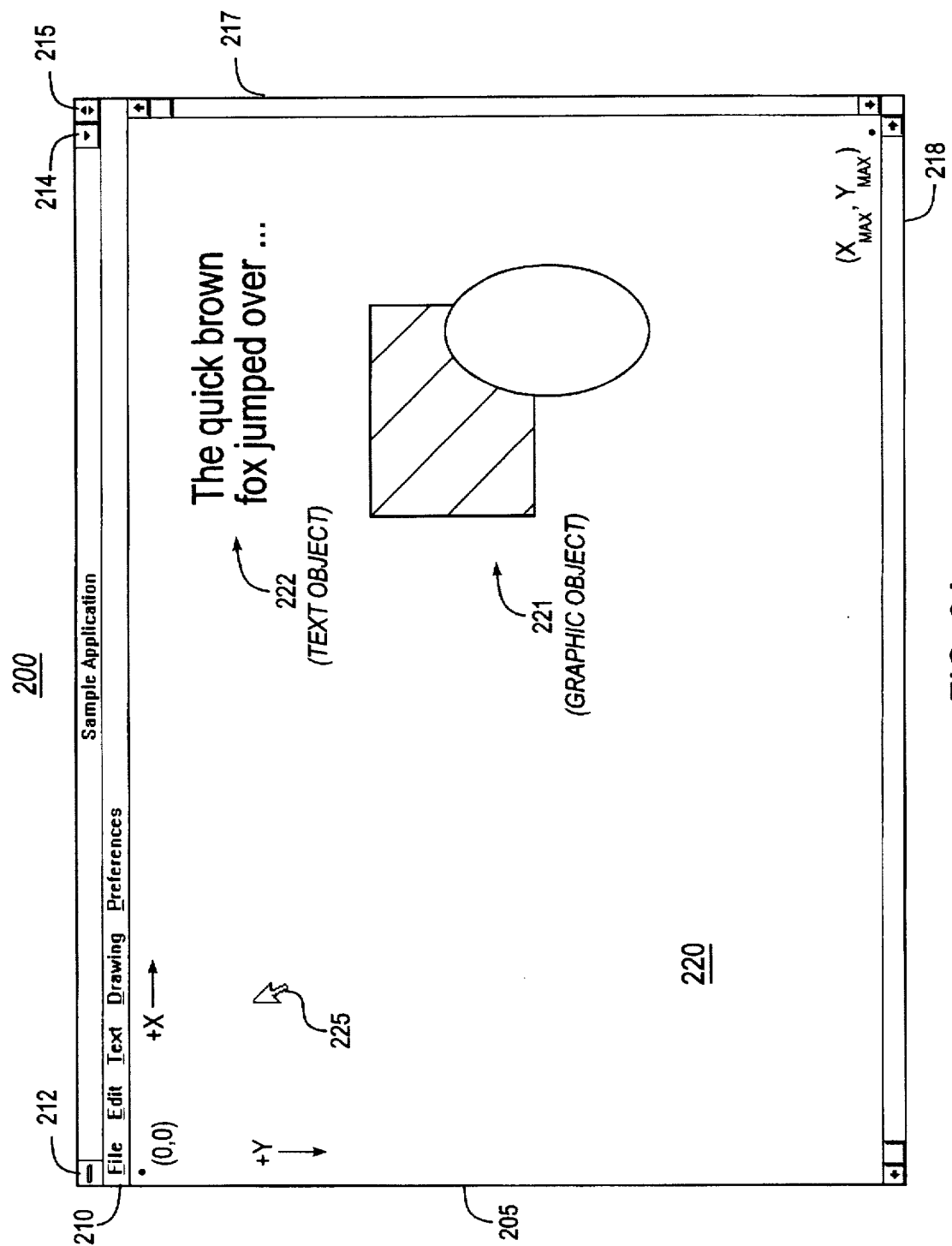
FIG. 2A is a screenshot bitmap of an event-driven graphic user interface employed the present invention.
Figure 2B:
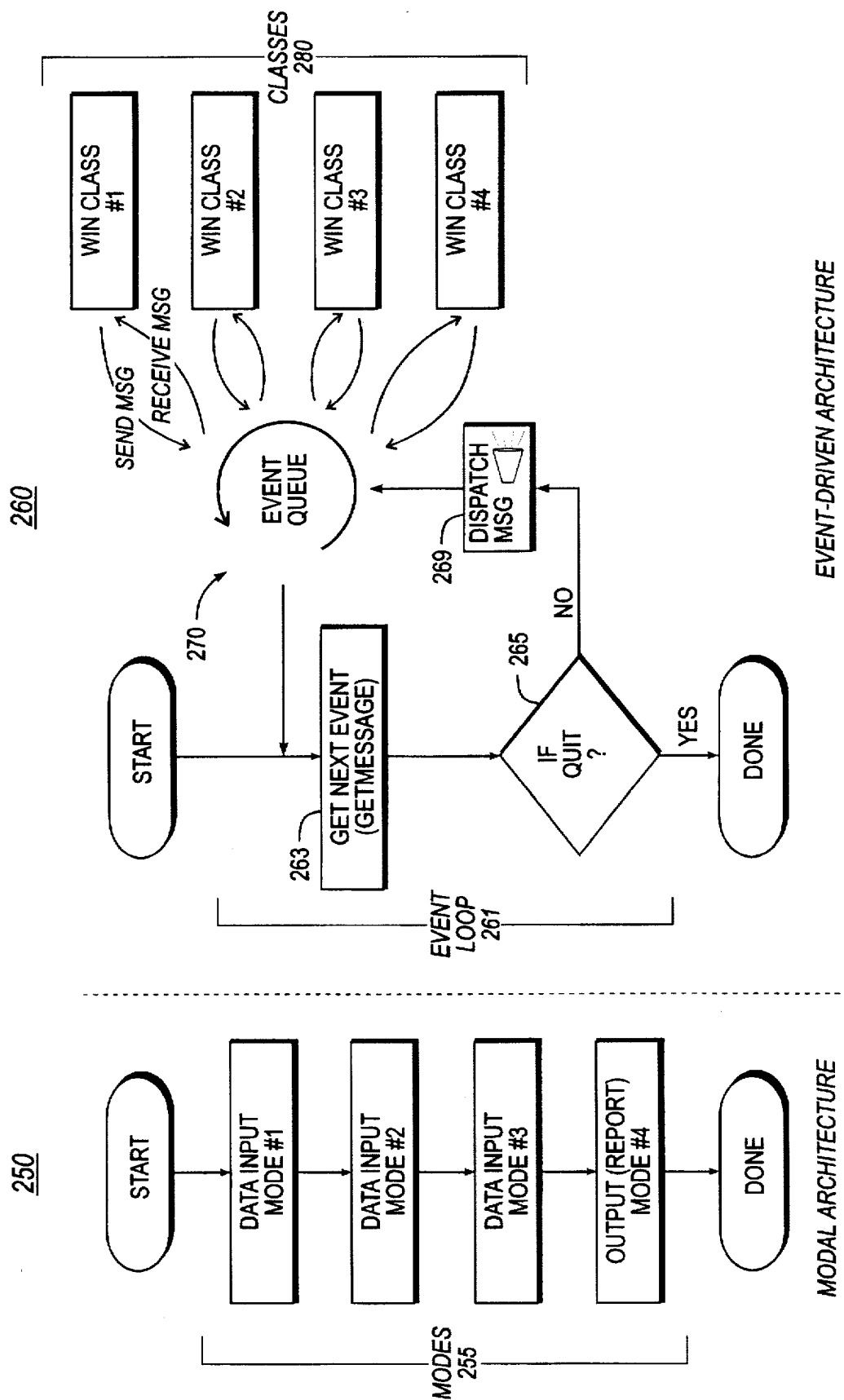
FIG. 2B is a block diagram comparing an event-driven model with traditional modal architecture.

As shown in FIG. 2B, a modal program 250 comprises a series of discrete operating blocks or modes 255, with a well-defined beginning, middle and end. In actual operation, such a program typically displays a series of input screens for receiving user information, for example, to create a written report. For instance, the first entry screen may require a customer name, the second a customer address, the third a part number, and so on. The program typically terminates in an output mode, for reporting results determined from the various inputs. Thus, the program 250 follows a fairly rigid sequence of operation, with each input or entry mode demanding successful completion before the program proceeds to the next step.

While a modal program is relatively easy to design and implement, it is not so easy to use. The design certainly ensures that all required information is entered, but only at the expense of forcing users to operate in a manner dictated by the program. Specifically, since the program is built around a pre-arranged set of modes, a user cannot get from one mode to another without first completing a previously-required mode. In the present example, for instance, a user must needlessly complete a customer name entry screen (and any other intervening input screens) just to access part number information. Any deviation from this sequence by the user is simply not permitted. Lacking flexibility, modal programs make a poor choice for handling real-world tasks.

As shown in the second half of FIG. 2B, an event-driven architecture 260 eschews a pre-selected sequence, opting instead for an "event loop." The event loop 261 is a centralized mechanism for processing messages about user and system events. It includes an event queue 270 and mechanisms for retrieving 263 and dispatching 269 messages to various window classes 280. Before each of these components is further described, it is helpful to understand the notion of "messages."

In a typical modal environment, especially those typified by a character-based UI, a program reads from the keyboard by making an explicit call to a function, such as the C function getchar(). The function typically waits until the user presses a key before returning the character code to the program; all system activity ceases until completion of this one step. In a Windows environment, in contrast, the operating system uses messages to manage and synchronize multiple applications and hardware events, such as clicks of a mouse or presses of a keyboard, which in MS-Windows are converted to messages by Windows event handlers.

From a programming perspective, a message is simply a data structure containing information about a particular event. In MS-Windows, a message structure includes a message identifier, a 16-bit unsigned integer which serves as a symbolic constant for a particular event. For example, messages from a window object might include information about creating (WM_CREATE), closing (WM_CLOSE), moving (WM_MOVE), and re-sizing (WM_SIZE) the window. Additional event data are available as message parameters (e.g., Windows wParam and lParam); the exact interpretation of a given parameter vary with each event type represented. Input messages are collected in a system-wide queue and then directed to the proper window. These messages, along with timer and screen paint (screen redraw) messages, must be passed to the target application(s) of interest.

A mechanism is provided for retrieving messages from the system queue and dispatching them to the appropriate application which, in turn, may proceed to process any message that arrives. Each window belongs to a particular window type which defines certain characteristics common to all windows of that type. Associated with each type is a Windows function which processes all messages sent to windows of its type. An application queue is provided where Windows may place messages that belong to a specific application. When the application is ready to receive input, it simply reads the awaiting messages. If none are found or if there exists a message for other applications with higher priority, Windows passes control to the other applications.

To process these events, therefore, a message or event loop 261 may be simply constructed as:

```
while (GetMessage (&msg, NULL, 0, 0))
{
    TranslateMessage (&msg) ;
    DispatchMessage (&msg) ;
}
return msg.wParam ;
}
``` where a message (&msg) is retrieved by a call to GetMessage (step 263); if needed, the retrieved message may be translated by a call to TranslateMessage and then dispatched by a call to DispatchMessage (step 269). This "while" loop continues until the GetMessage function returns a value of zero—indicating that the loop has read a WM_QUIT message from the queue, telling the application to end (yes at step 265).

The general mechanism for retrieving and dispatching messages in an event-based system, such as Microsoft Windows, is known in the art; see, e.g., Petzold, C., *Programming Windows*, Second Edition, Microsoft Press, 1990. Additional information can be found in Microsoft's Window Software Development Kit, including: 1) *Guide to Programming*, 2) *Reference*, Vols. 1 and 2, and 3) *Tools*, all available from Microsoft Corp. of Redmond, Wash. The disclosures of each of the foregoing are hereby incorporated by reference.

C. Development System

Figure 3A:
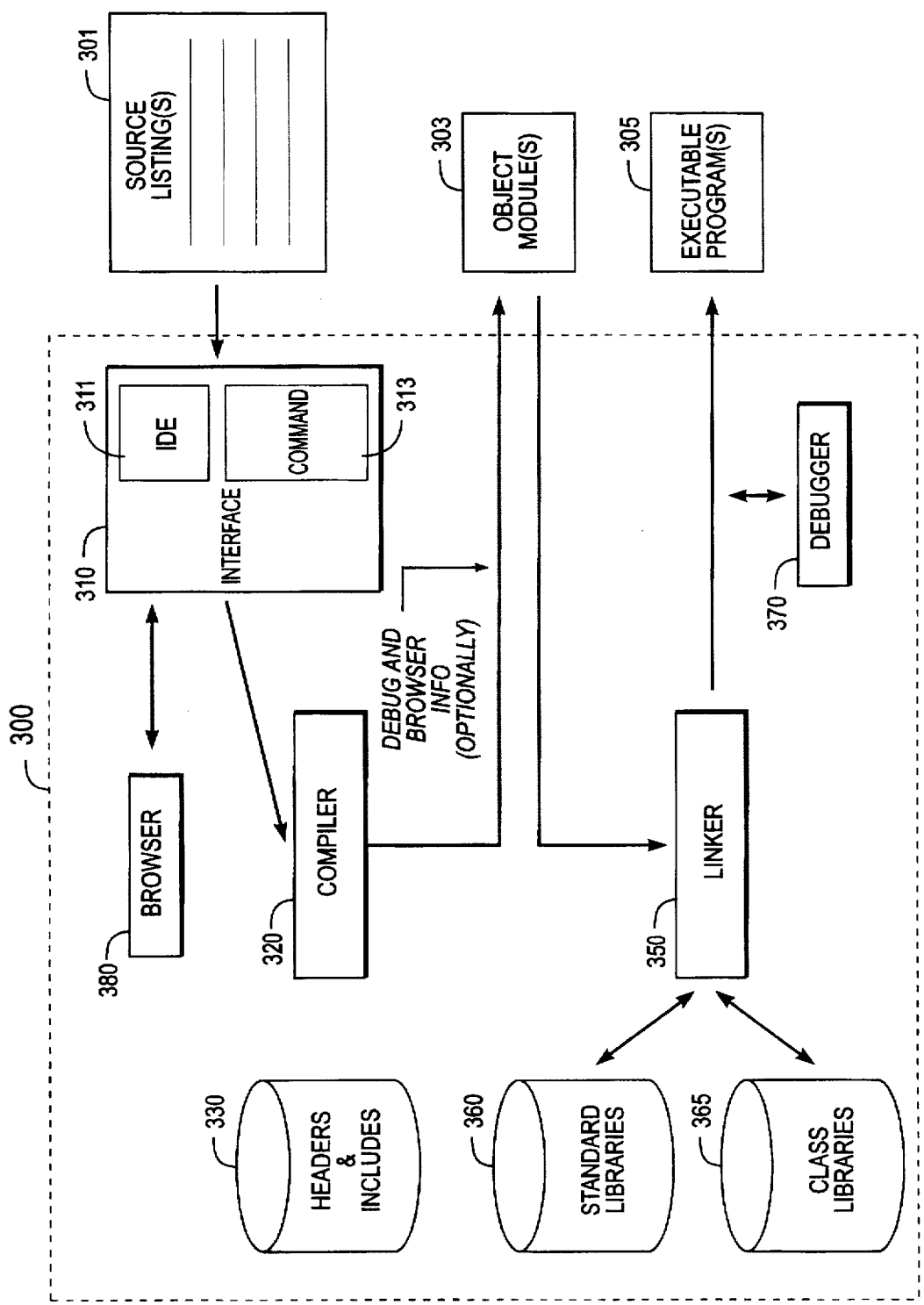
FIG. 3A is a block diagram of the development system of FIG. 1B.

Referring now to FIG. 3A, the development system 300 of the present invention will now be described in further detail. System 300 includes an compiler 320, a linker 350, and an interface 310. The general operation of these components will now be described.

Figure 3B:
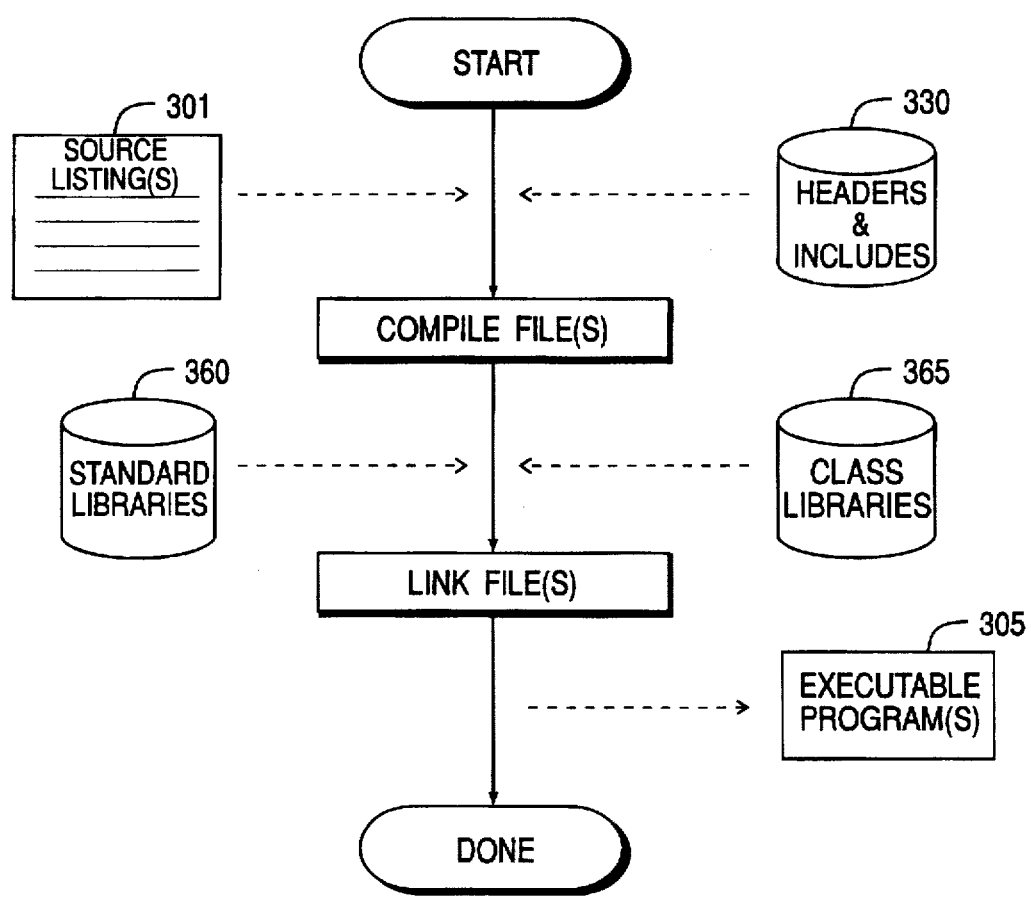
FIG. 3B is a flowchart illustrating the general operation of the development system of FIG. 3A.
Figure 4B:
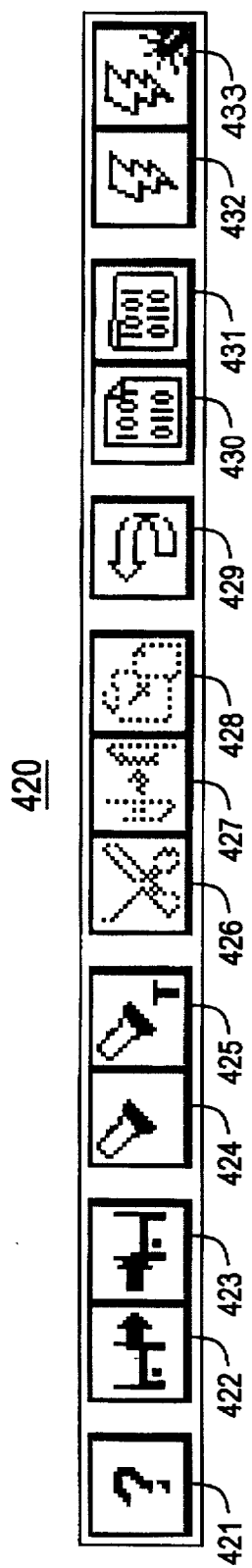

As shown in FIG. 3B, interface 310, through which the user or developer supplies source listings 301 to the compiler 320, includes both command-line driven 313 and Integrated Development Environment (IDE) 311 interfaces; the former accepts user instructions through command-line parameters, the latter providing menuing equivalents thereof. Shown in further detail in FIGS. 4A-B as interface 400, the IDE is a rectangular GUI interface including a main menu 410, a toolbar 420, a client area 450 (for editing source listings), and a status line 440. Menu 410 is a conventional Windows pulldown menu system, whereby the user may enter commands with a keyboard or mouse device. Typical commands include, for instance, file open, search and replace, compile, and the like. Toolbar 420 compliments the menu 410, in essence duplicating much of its functionality. Shown particularly in FIG. 4B, the toolbar 420 includes individual tools or screen buttons 421-433, which are accessible to the user with a single mouse click. For instance, button 421 provides general online help, while buttons 422, 423 provide instant access to disk files. Buttons 424, 425 provide search functionality; buttons 426-428, on the other hand, provide cut and paste features. Button 429 provides an undo feature for reversing or "undoing" user operations. Finally, buttons 430, 431 provide compile and make features, and buttons 432, 433 perform make and run operations.

Client area or editing worksurface 450 is where most of the work of creating application software occurs. In this regard, surface 450 includes a text editor interface for displaying and editing the source listings which are compiled into application or system software. In the code snippet shown in FIG. 4A, for example, editor surface 450 includes a Pascal source file for a Windows application program. Specifically, the "symbols" which comprise the source listings are displayed. Thus, the symbols are the basic constructs which are employed for developing the application software. For instance, "HandleSend" is a method (in this instance a Pascal procedure) for the class TTestApplication. TTestApplication, in turn, is derived from TApplication. Needless to say, a program of even modest complexity will have numerous symbols which somehow must be managed by the programmer. And for object-oriented programming systems in particular, the symbols will often comprise a complex hierarchy—one which may be conceptually difficult to visualize.

Referring back to FIGS. 3A-B, from the source code 301 and header/include files 330, the compiler 320 "compiles" or generates object modules or files 303. As shown, the compilation process may include debugging and browsing information; specifically, explicit references to the symbols of the source listings (e.g., line numbers) are stored in the object modules 303. As described in further detail hereinbelow, this information is referenced by a browser 380 (preferably through the interface 310). Upon successful creation of object (.obj) files, linker 350 next "links" or combines the object files 303 with standard libraries 360 (e.g., graphics, I/O routines, startup code, and the like) to generate program (s) 305, which may be executed by a target processor (e.g., processor 101 of FIG. 1). In addition to standard libraries, development system 300 provides class libraries 365, C++ libraries which simplify windows development (as described in further detail hereinbelow). A debugging module 370 may be added, as desired, for eliminating errors in the program listings 301. In a preferred embodiment, system 300 includes Borland C++ & Application Frameworks™ 3.1, available from Borland International of Scotts Valley, Calif.

For general background on the construction and operation of compilers, see e.g., Fischer et al., *Crafting a Compiler with C*, Benjamin/Cummings Publishing Company, Inc., 1991, the disclosure of which is hereby incorporated by reference.

Simplified Windows Development: Object-oriented Programming

A. Introduction

When one examines what makes Windows programming difficult, two things stand out: the event-driven model and the voluminous code required to make anything happen. Object-oriented programming (OOP) provides a simplified approach to both. With an object-oriented language, the programmer does not have to write a lot of tedious Windows message-dispatching code with special case arms for different types of messages. Instead, he or she creates reusable objects which know how to respond directly to individual message.

Of particular interest to the present invention are object-oriented embodiments supporting C++ and Object Pascal programming language, which includes features of data encapsulation, inheritance, and polymorphism. For a general introduction to C++, see e.g., Ellis, M. and Stroustrup, B., *The Annotated C++ Reference Manual*, Addison-Wesley, 1990. Additional information about object-oriented programming and C++ in particular can be found in Borland's C++ 3.1: 1) *User's Guide*, 2) *Programmer's Guide*, and 3) *Library Reference*, all available from Borland International of Scotts Valley, Calif. General information describing the syntax of object pascal can be found in Borland Pascal with Object, also available from Borland. The disclosures of each of the foregoing are hereby incorporated by reference.

B. Improved Browsing of Symbol

According to the present invention, a browser 380 is provided for exploring the objects in one's programs. In particular, the user can browse through object hierarchies, units, and all the procedures, functions, variables, types, constants, and other symbols his or her program uses. Using the browser of the present invention, one can do the following:

1) View the object hierarchies in an application, then select an object and view all the procedures, functions, and other symbols it contains. As the user examines a symbol, he or she can choose to list all references to it in a program and, if desired, go directly to where it is used in the source code.

2) List the global symbols a program uses and list their declarations. If the user selects one, he or she can list all references to it in his or her program and, if desired, go directly to where it is used in the source code.

3) List all the object modules (e.g., Pascal units) a program uses, then select one and list all the symbols in its interface part.

4) Select a symbol in one's source code, then view its details instantly (e.g., by clicking the right mouse button).

5) Open multiple browser windows, compare the symbols displayed in different windows, and then return to a local symbol.

Figure 5:
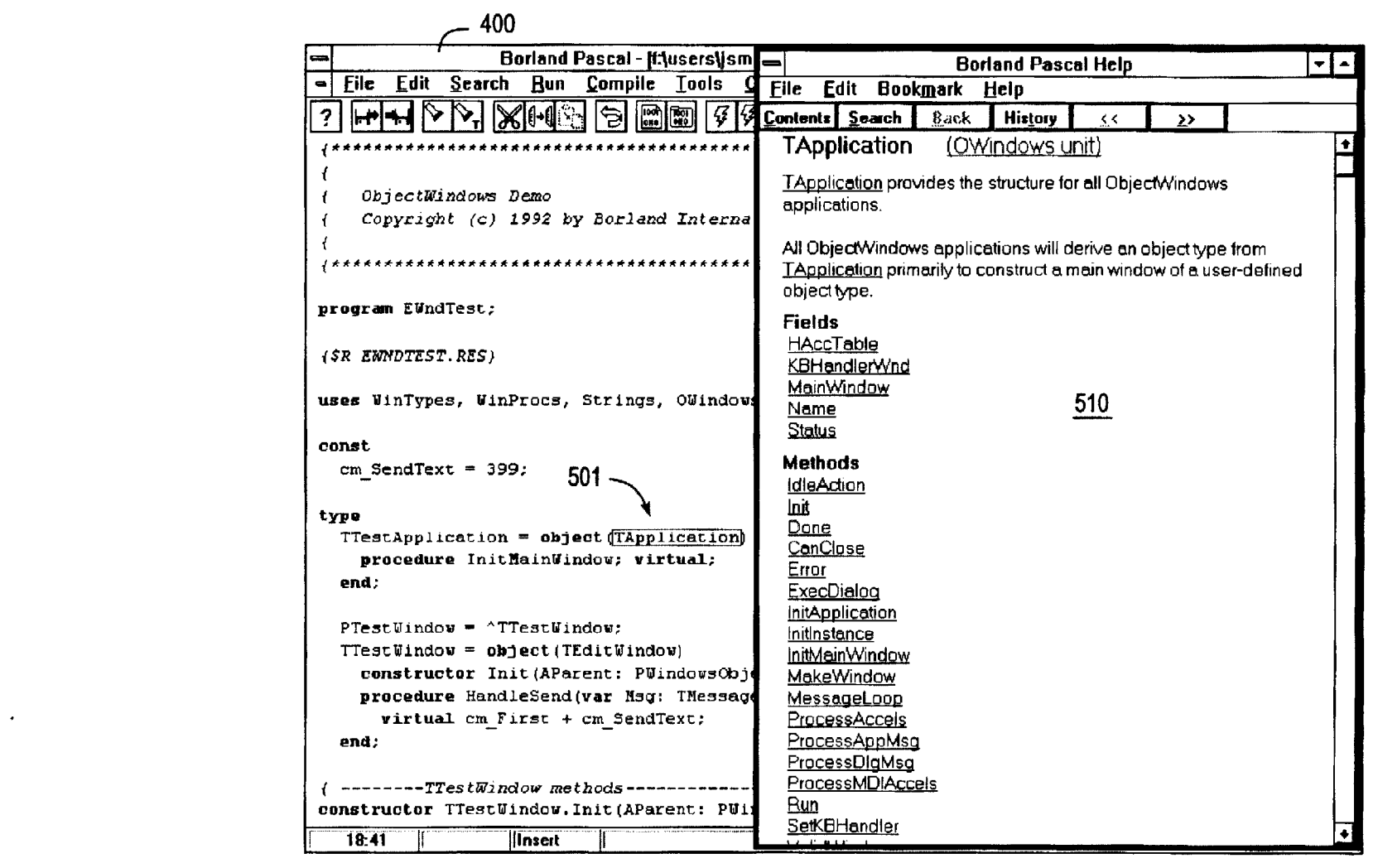

At this point, a distinction should be made between browsing in accordance with the present invention and the mere presentation of static class hierarchy information. As shown in FIG. 5 for the IDE 400, for example, the user has selected a symbol, the class TApplication 501. In response to a user request for help information, the system displays the help dialog 510. Not unlike a conventional browsing system, help dialog 510 merely provides static information akin to an on-line help system. The browser of the present invention, in contrast, provides "live" or dynamic symbol information derived directly from one or more object (or executable) files as will now be described.

Figure 6A:
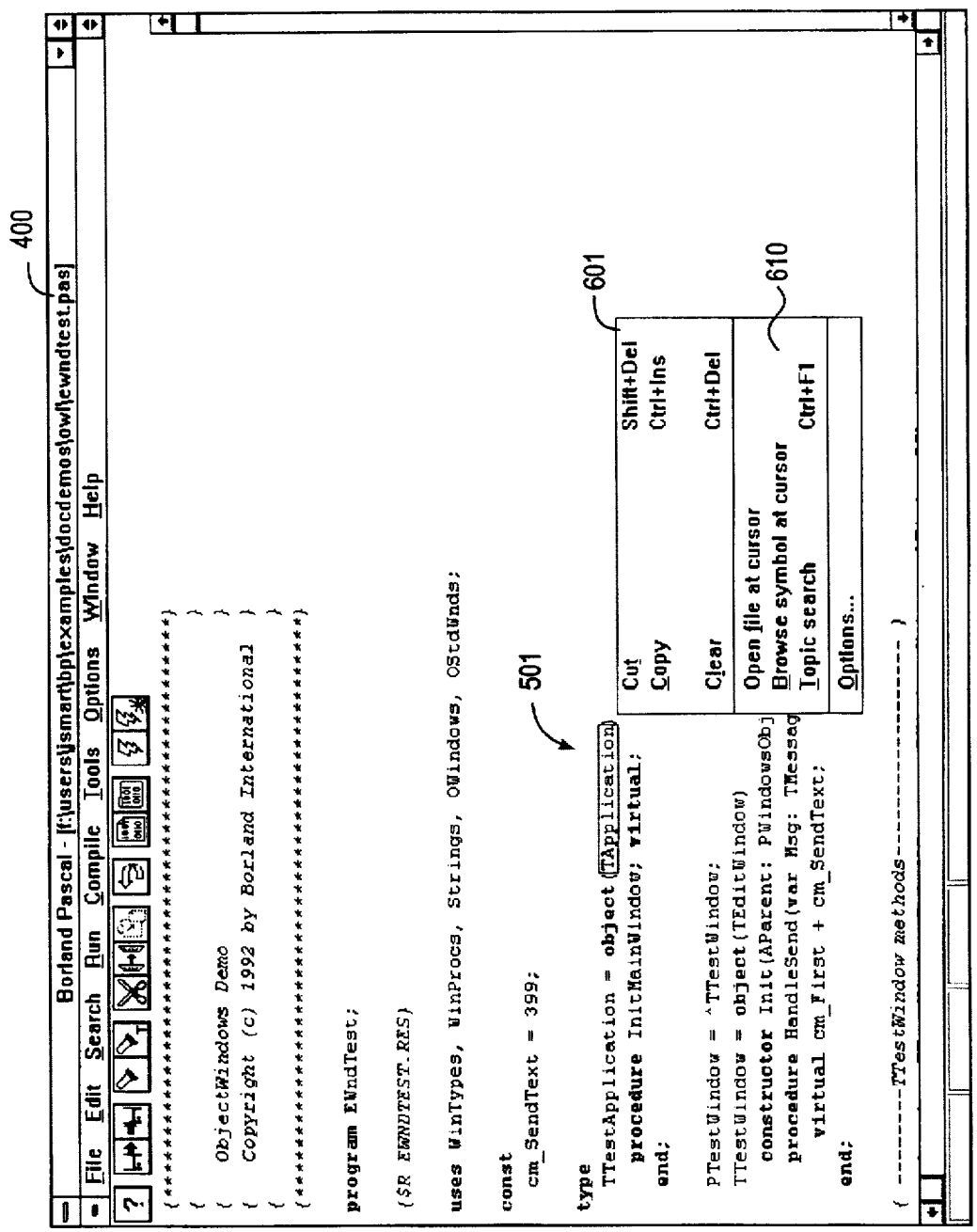
Figure 6B:
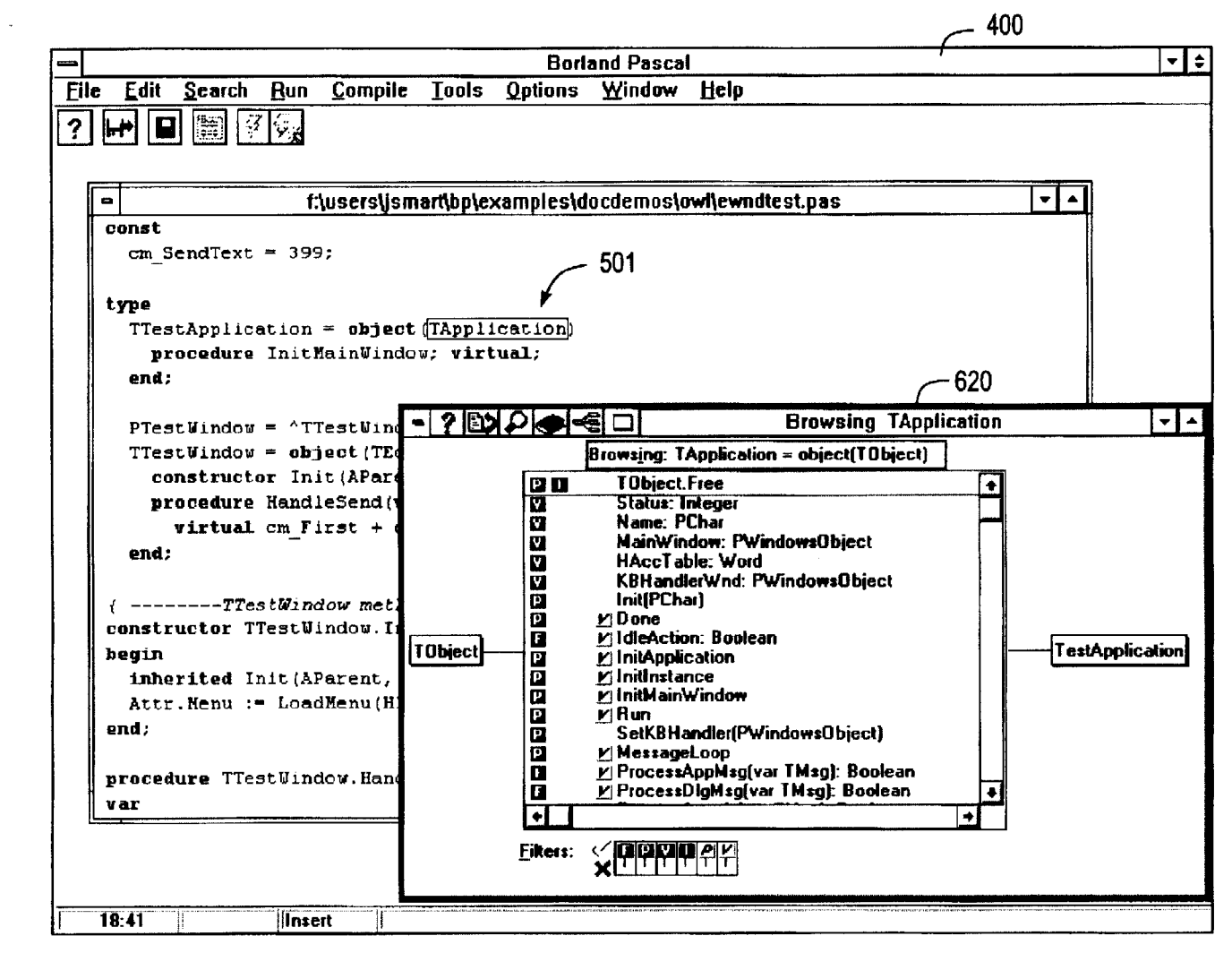

In general operation, the user compiles the program he or she wants to browse. Next, the browser is activated (e.g., choose Objects, Unit, or Globals on the Search menu). Alternatively, the user can also place the screen cursor on the symbol of interest in the code and launch the browser (e.g., choose Search|Symbol). As illustrated in FIGS. 6A–B for the IDE 400, for example, the user selects the symbol 501 and invokes the browsing local menu 601, which includes a plurality of choices relevant to the symbol currently being browsed. Upon selection of "browse symbol at cursor" 610, the system displays a browsing window 620 (as shown in FIG. 6B). The construction and operation of the browsing window itself is set forth in further detail hereinbelow.

According to the present invention, the compiler "remembers" or preserves symbol information between compilations by storing references (e.g., line numbers) in the object file. If one makes a change to a program, but the next compilation fails, the symbol information is still available from the previous compilation. Therefore, the user can still browse through the program to help pinpoint where the problem lies. In a preferred embodiment, this feature is provided as a Preserve Symbols option (a default setting). While the browsing information is stored within the object file, no particular object file format is required for practicing the present invention. For instance, the present invention may be implemented within Microsoft's .obj file format; for a description of the format, see e.g., Siering, T., *Understanding and Using .OBJ Files*, C Gazette, Volume 5, Number 3, pages 11–31. In a preferred embodiment, Borland's object file and symbol table formats are employed; see e.g., *Borland Languages Open Architecture Handbook*, 1991, available from Borland International. The disclosures of both of the foregoing references are hereby incorporated by reference.

As show in the figures below, the user can also invoke a "Browse Symbol at Cursor" (e.g., from an edit window local menu) to quickly browse the symbol the cursor is resting on in the code. With a mouse device, the approach to browsing through one's code is most convenient if a mouse button (e.g., the right one) is dedicated to activating the browser. In this fashion, the user can readily inspect an object, procedure, function, variable, or other symbol in the source code by clicking on it (in conjunction with a keyboard event, if desired).

Figure 7A:
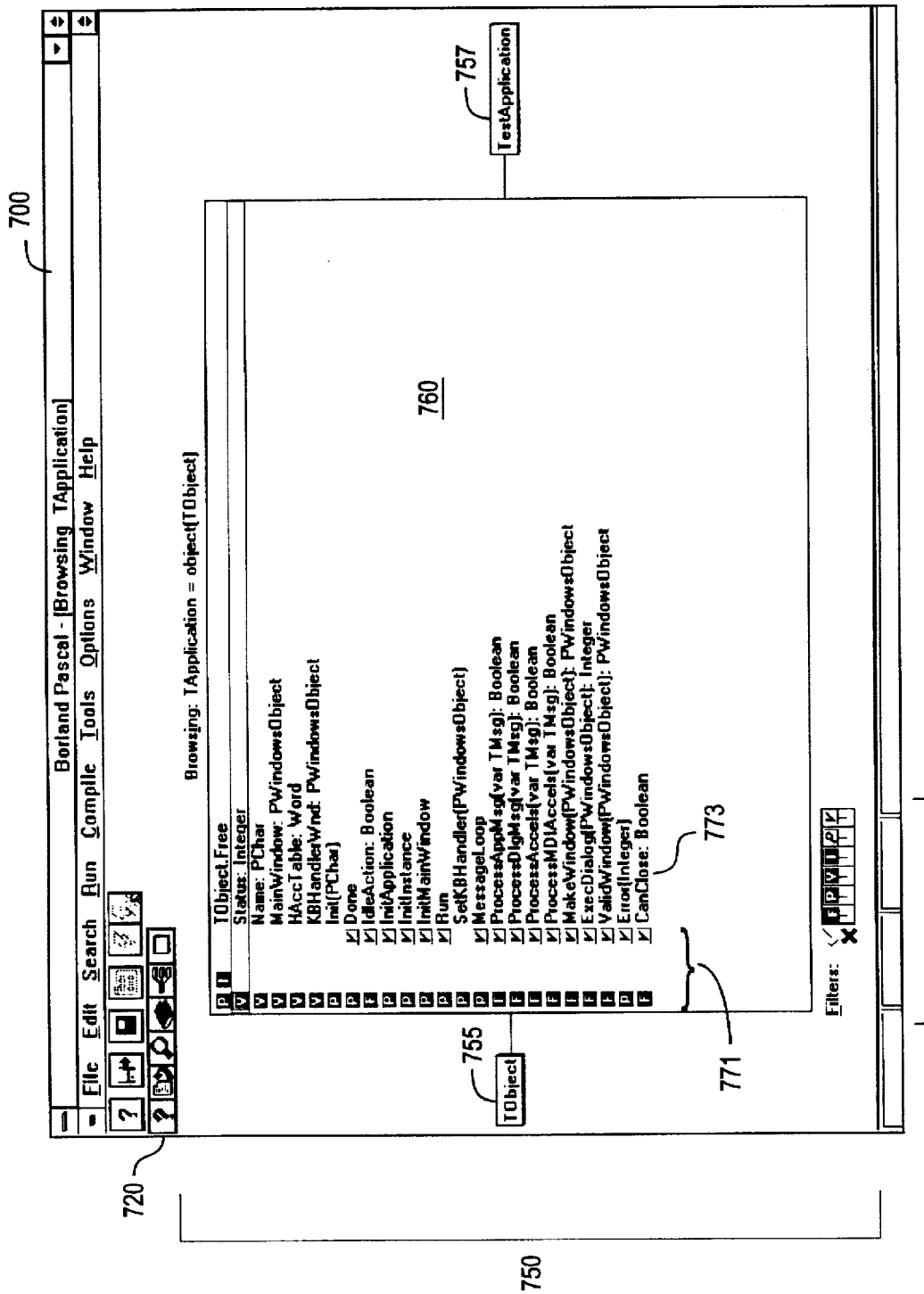
FIGS. 7A–F are screen bitmaps illustrating construction and operation of the browser module of FIG. 6B.
Figure 7B:
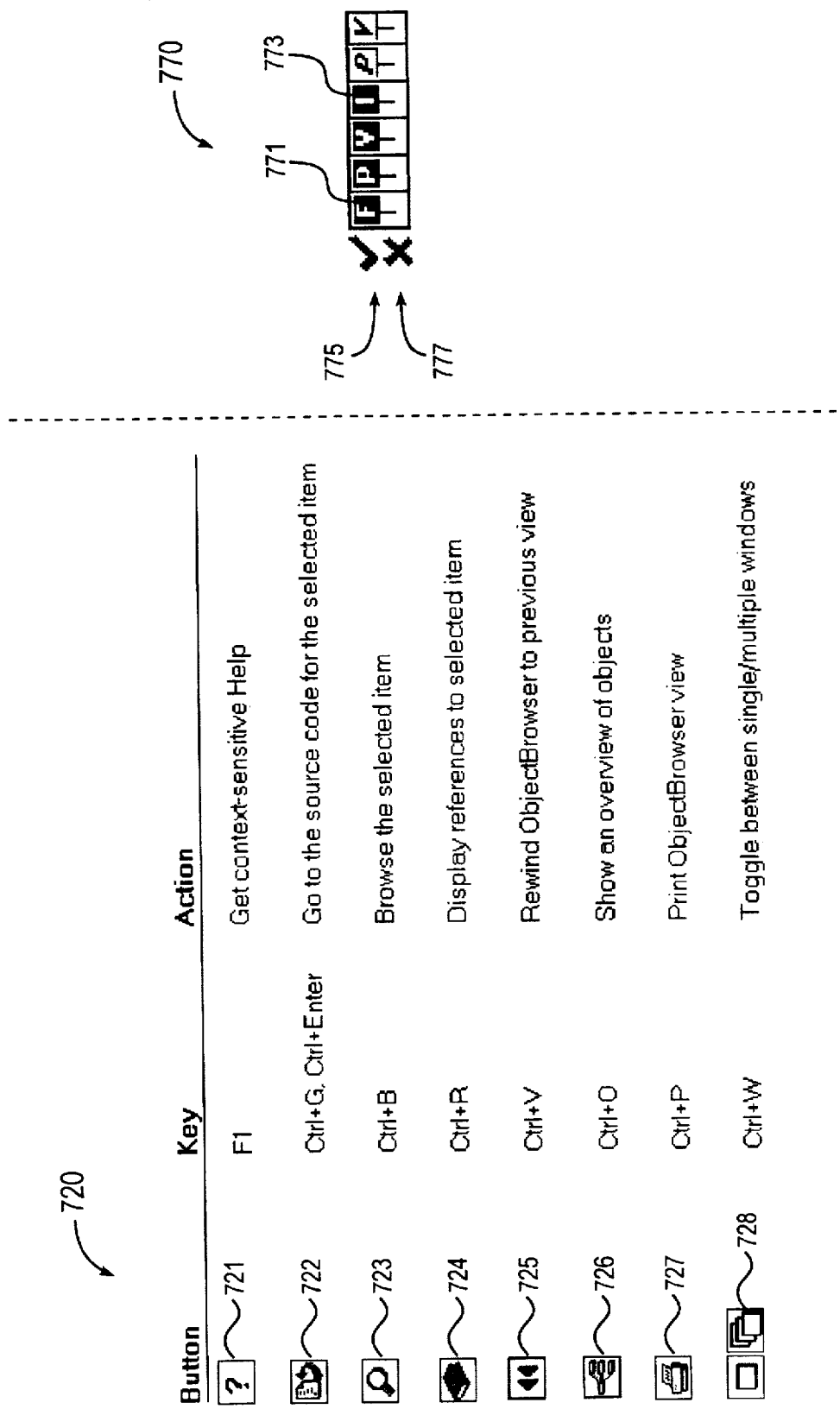

Referring now to FIGS. 7A–B, a preferred user interface for the browser is shown. Browser window 700 includes a toolbar or button (screen) icon menu 720 at the top of the window. A button is invoked in response to a user event, e.g., clicking it with a mouse cursor or using a hot key. As shown in FIG. 7B, the buttons and the action they perform are as follows. Help button 721 (keyboard equivalent: F1) provides help information. Code button 722 (keyboard equivalent: Ctrl+G) goes to the source code for the selected item. (For search buttons, exactly which buttons appear on the Speed-Bar depends on which browser window the user is working with). For browse button 723, (Ctrl+B) the system browses (view the details of) the selected item. For back button 725 (Ctrl+V), the system views the previous browser window (if any). For object hierarchy viewing, button 726 (Ctrl+O) displays an overview of the object hierarchy. Reference button 724 (Ctrl+R) causes the system to list all references of a symbol. Print button 727 directs a graphical representation of the object hierarchy to the printer. For single window button 728 (Ctrl+W), the system replace current browser window. For multiple window button 728 (Ctrl+W), the system opens a new browser window. The last two buttons shown are actually two different views of the same button.

The first time the user uses the Browser, the single window button is displayed. After selection, it is replaced with the multiple window button. When one chooses the single window button and begins browsing, a new browser window replaces the previous window each time one performs a new browsing action. When one chooses the multiple window button, windows remain onscreen until they are closed. One can quickly reverse the action of the Window buttons by holding down Shift as one selects the next browse action. For example, if the Multiple Window button is displayed, when the user holds down Shift, the next browser window opened replaces the current one.

As shown in FIG. 7A, the browser window 700 includes a client area 750. This is where browsing information is displayed. As shown, client area 750 displays a list of browsing information 760, which comprises context-sensitive browsing information for the current symbol. Also shown are parents (superclasses) and children (subclasses) for the current symbol (which in this instance is a class). As readily seen, TApplication class includes a TObject parent class 755 and a TestApplication child class 757.

Also shown in FIG. 7A, browsing window 700 includes a filter interface 770 for filtering or otherwise selectively restricting the display of members in the list 760. Corresponding to the filter interface 770 are type identifiers or indicia 771. These identifiers readily communicate type information for a member of the list. The boolean function CanClose 773, for example, is a symbol of type function (F), which also happens to be a virtual (V) function.

Figure 7C:
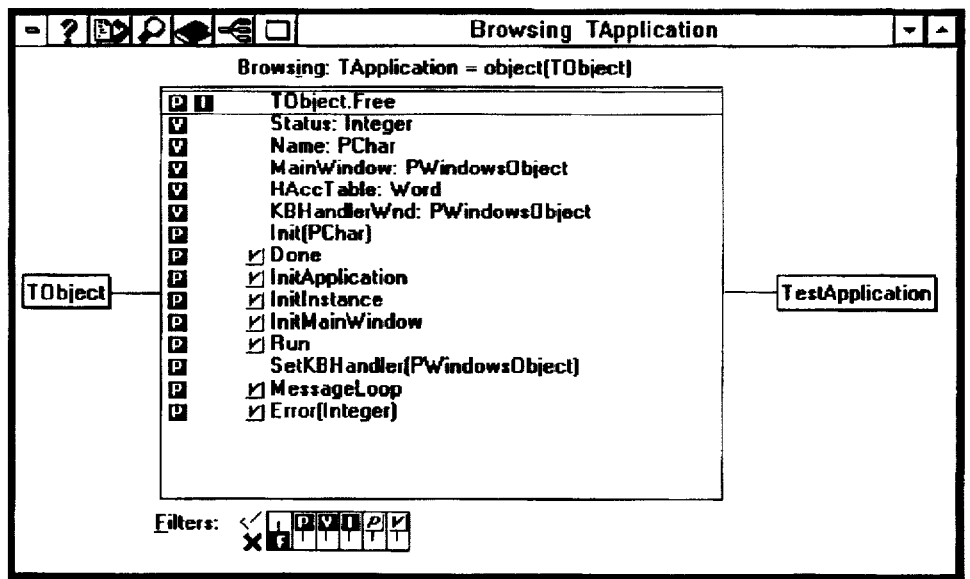
Figure 7D:
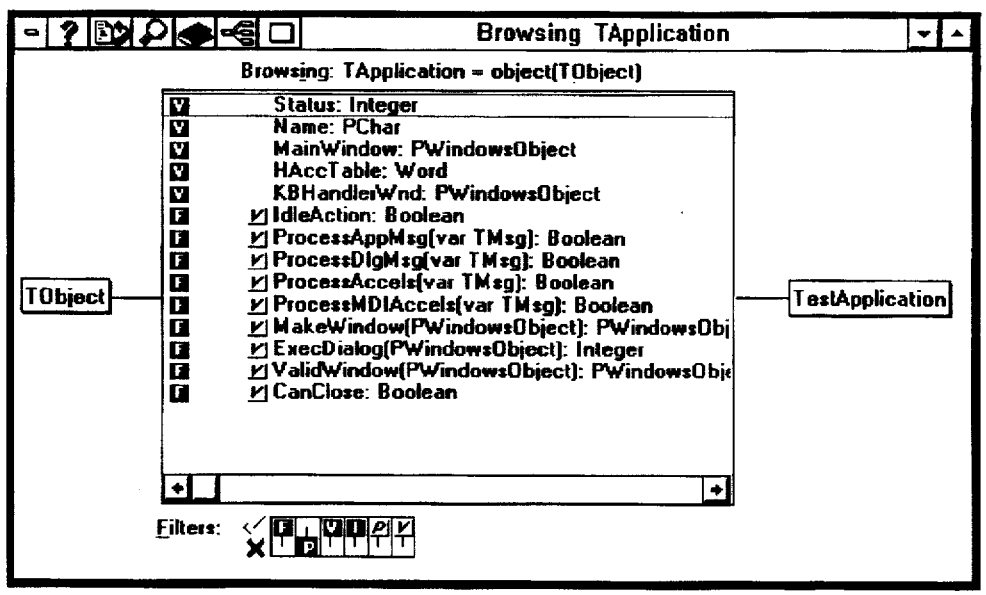
Figure 7E:
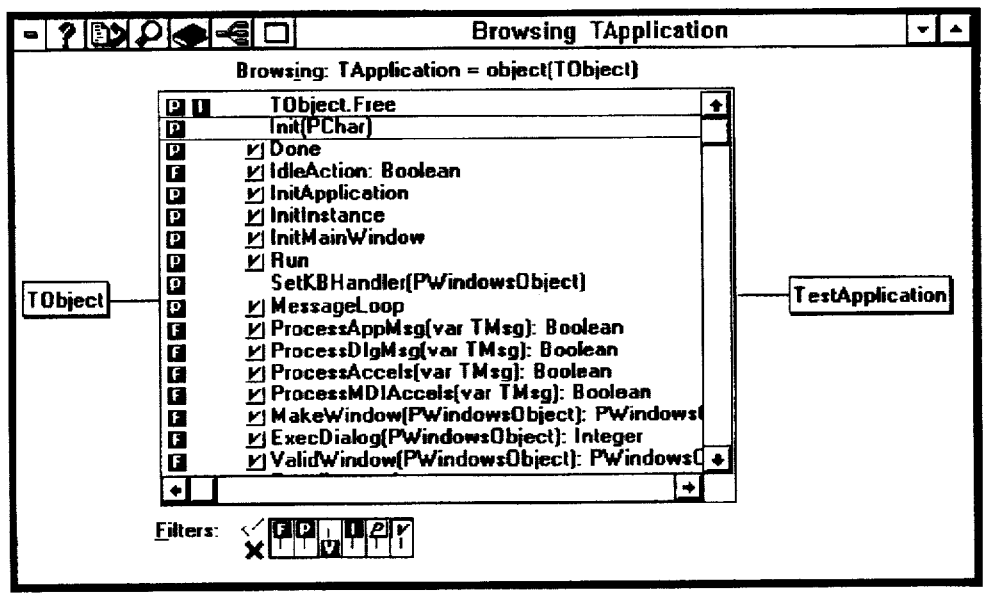
Figure 7F:
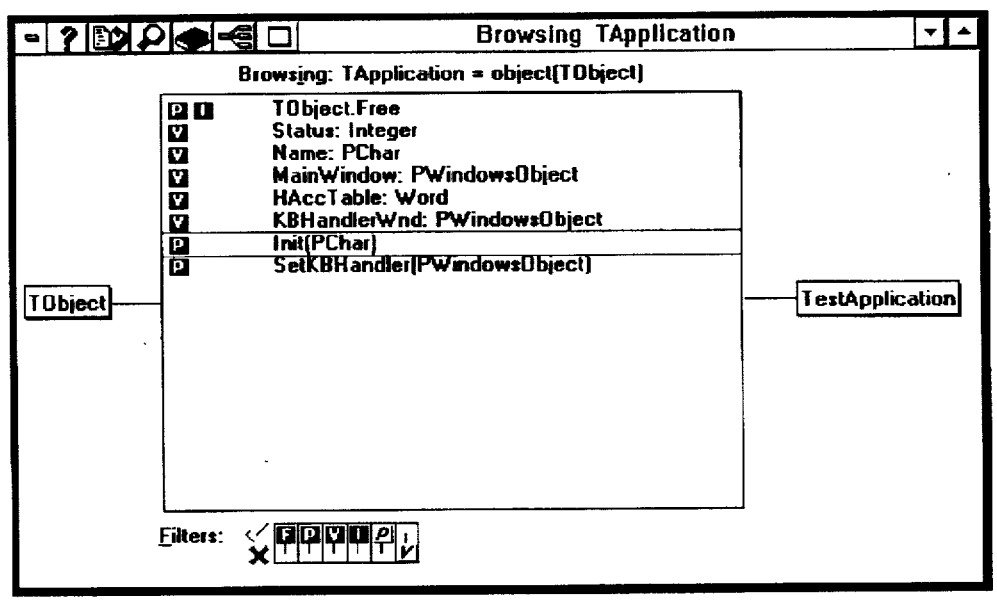

With particular reference to FIG. 7B, the operation of the filter interface 770 may now be understood. Interface 770 is a matrix displaying type information for the members of the list 760. For instance, the type "function" is shown as "F" 771, while the type "inherited" is shown as "I" 773. In a manner not unlike the operation of a DIP (dual-inline package) switch, the user may toggle typesettings between an on column 775 and an off column 777. The interplay between toggling typesettings in the interface 770 and the display of the list 760 is illustrated in FIGS. 7C-F. In FIG. 7C, the type "function" is toggled off; in response, members of type "function" are removed or "filtered" from the displayed list. FIGS. 7D-F illustrate the toggling of other filters, with the resulting effect on the displayed list.

Figure 7G:
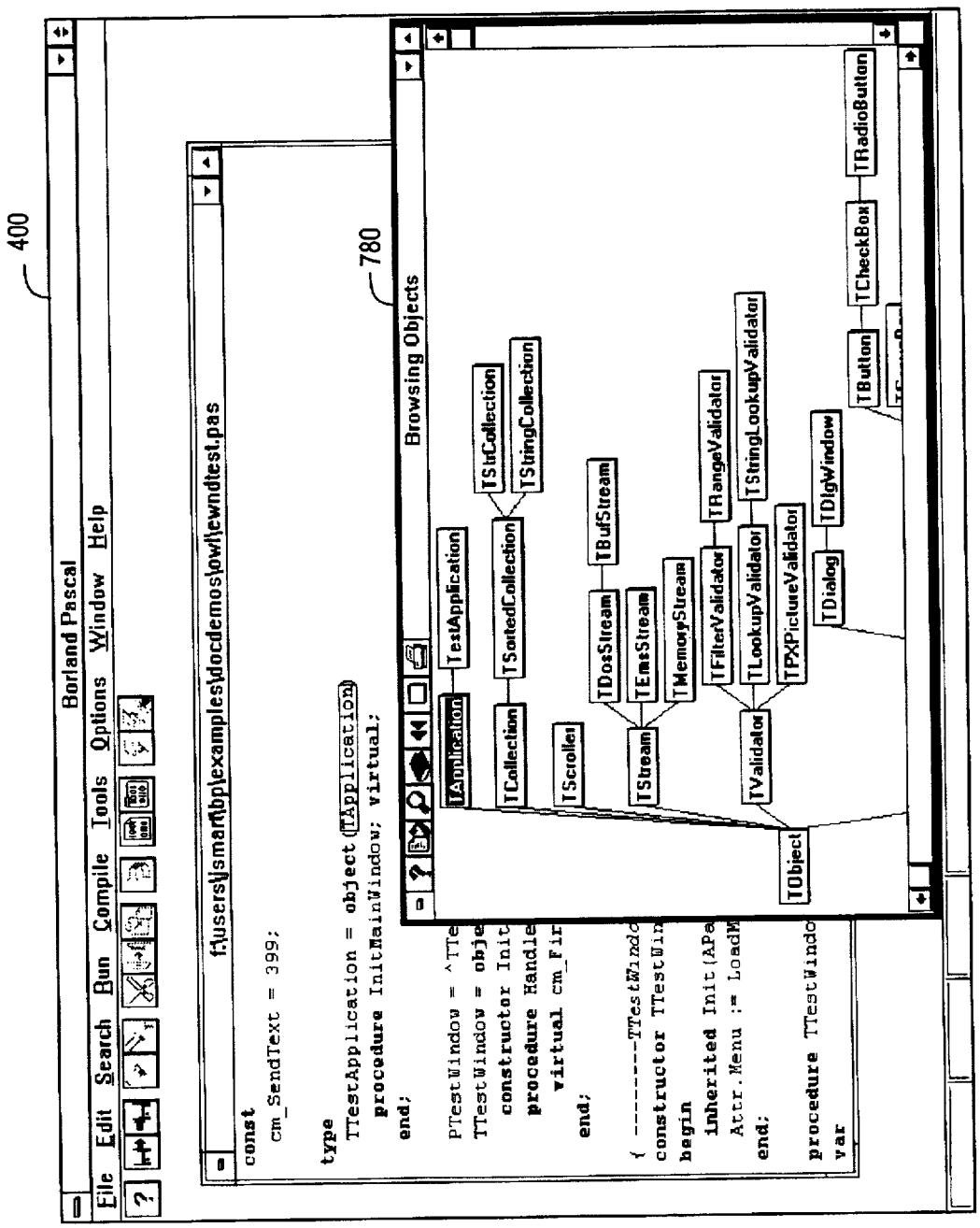
Figure 7H:
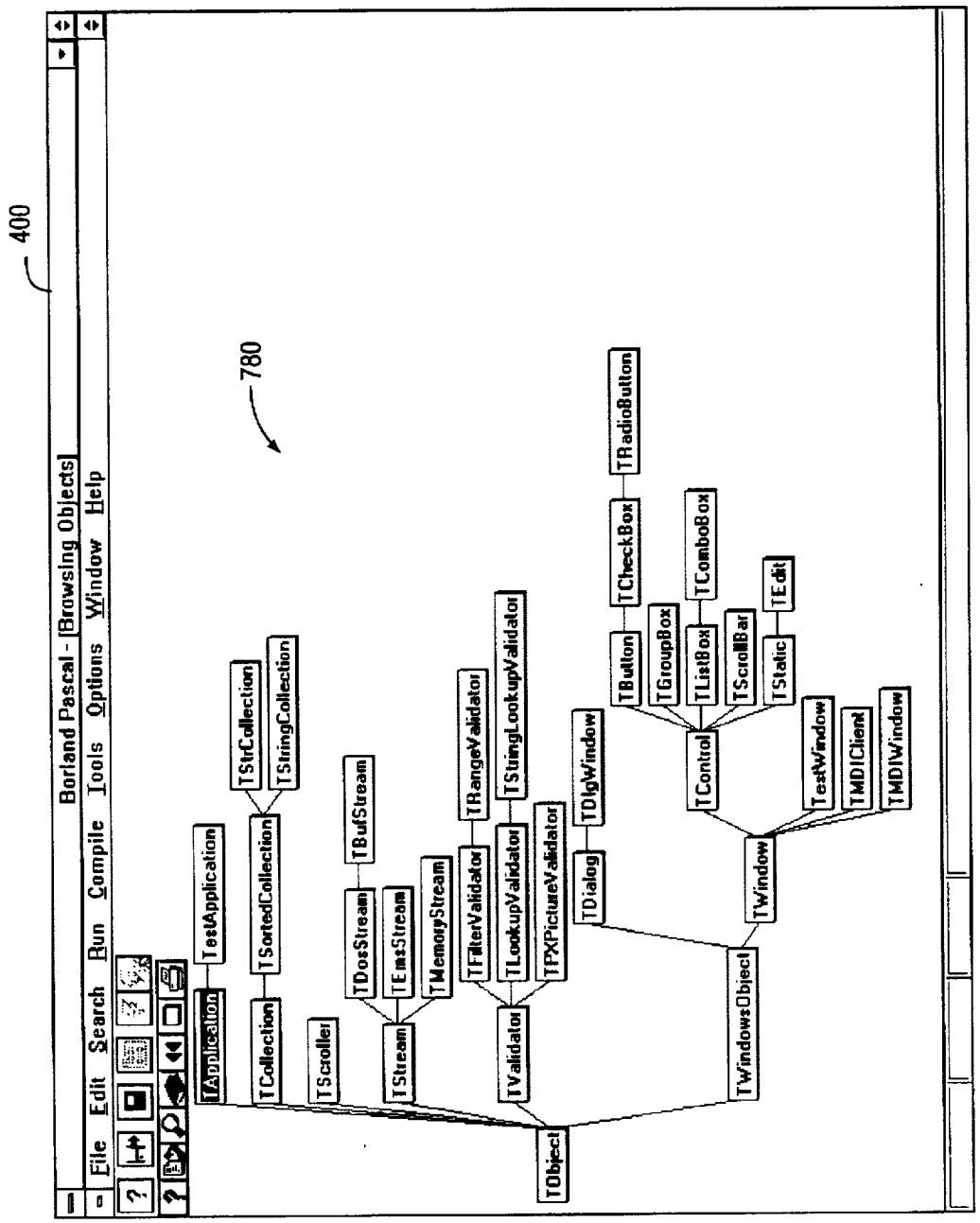
Figure 7J:
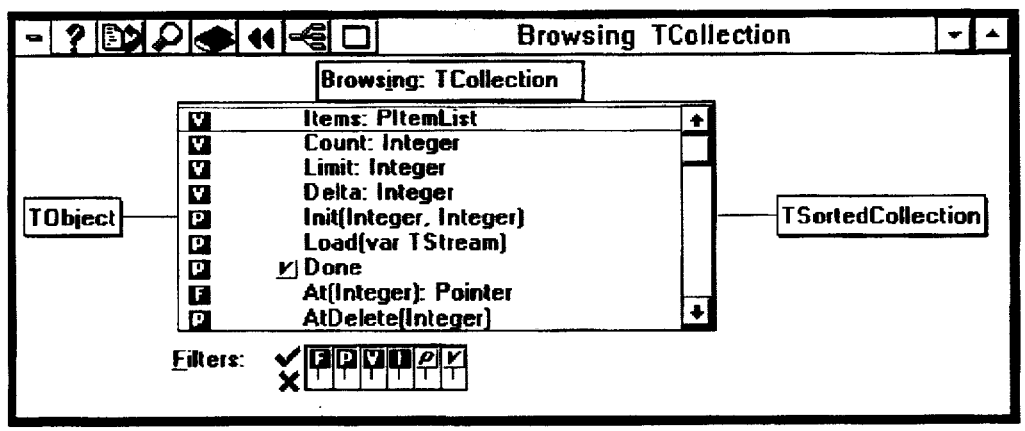
Figure 7K:
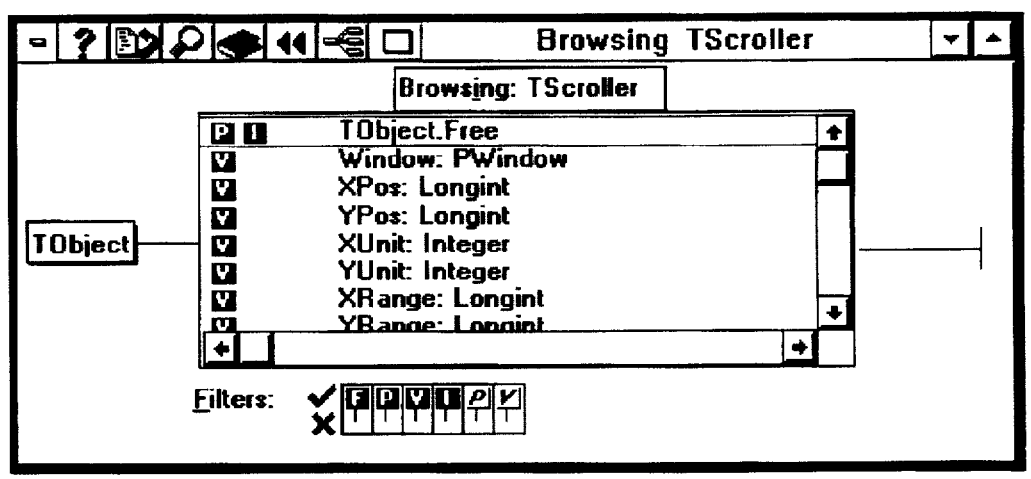
Figure 7L:
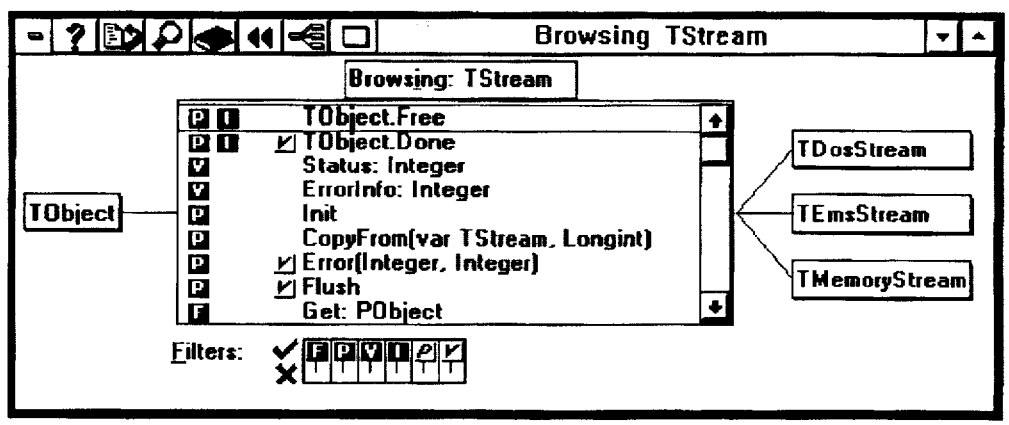
Figure 7M:
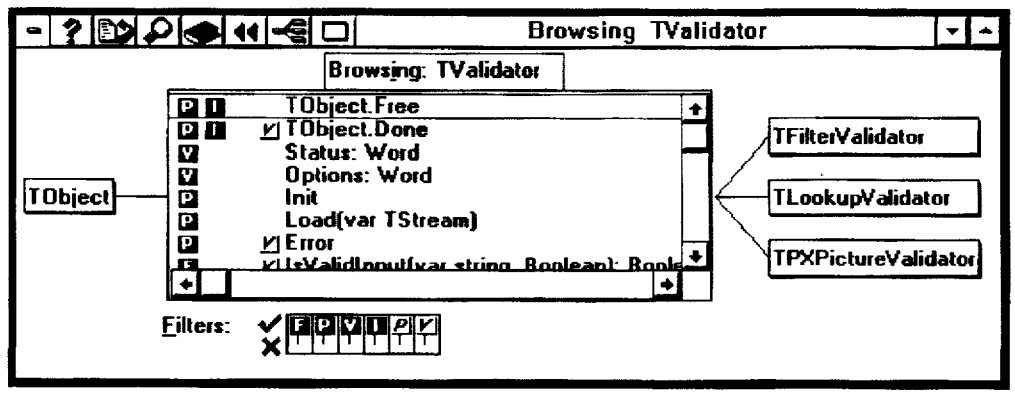
Figure 7N:
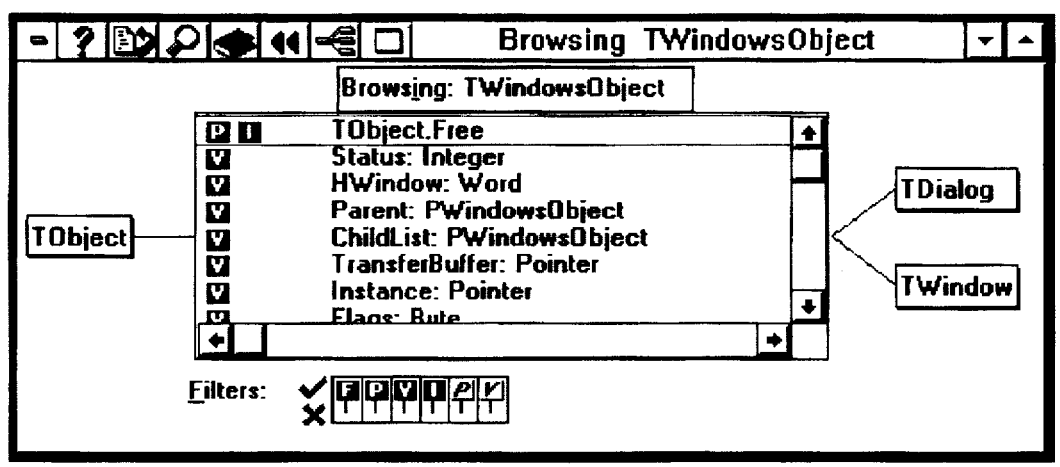

The browser of the present invention lets the user see the overall picture, including the object hierarchies in an application, as well as the small details. To see relationships (class hierarchy) between the objects displayed graphically, the user activates the browser (e.g., chooses Search!Objects). As shown in FIGS. 7G-H, the browser opens a window and draws the objects and shows their ancestor-descendant relationships arranged in a hierarchical structure, for instance, a tree 780. Connecting lines help to clarify ancestor and descendant relationships. Red lines are employed in the hierarchy to help the user see the immediate ancestor-descendant relationships of the currently selected object more clearly.

To see more detail about a particular object, a user need only select (e.g., double-click) it. In response, the browser lists the symbols (e.g., procedures, functions, variables, and the like) used in the object. This technique is illustrated in FIGS. 7I-N. In FIG. 7I, the window 781, which shows information for TObject (the parent of TApplication), is displayed in response to the user selecting TObject from the display area 780 (of FIG. 7H). In this manner, the user may readily browse up and down an inheritance hierarchy for inspecting its various members. FIGS. 7J-N illustrate the browsing of TCollection, TScroller, TStream, TValidator, and TWindowsObject—all descendants of TObject.

For a large object hierarchy, the user can choose to not display the descendants of a particular object (e.g., by pressing the − (minus) key). With a mouse, the user simply clicks the horizontal line that attaches the object to the hierarchy. Now the object displays a + (plus sign) next to it and is highlighted, indicating that descendants of this object are not displayed. To display the descendants of the object again, the user selects an object that is prefaced with a + sign and presses the + key. With a mouse, one clicks the horizontal line that attaches the object to the hierarchy. The descendants of the object reappear.

From the object hierarchy, one can view all the symbols declared in a single object. The user selects the object and press Enter or double-click the object. As the user views the symbols declared in an object, he or she can choose to see different views:

1) Clicking the letter I at the top of the browser window or press Ctrl+I displays inheritance information for the object one is browsing.
2) Clicking the letter R at the top of the window or pressing Ctrl+R displays a list of the program or unit lines where the symbol is referenced.
3) Clicking the letter S or press Ctrl+S displays the scope of the object. To find a symbol in a list of displayed symbols, the user types the first letters of the symbol's name; the cursor then moves to the symbol quickly.

In a preferred embodiment, the user is given considerable control as to how the browser displays information. For instance, the user can choose which symbols the browser displays. From a Browser Options dialog box, in the Symbols group, the user checks only the symbols he or she wants to see displayed in the browser. ONe can also choose to see symbols inherited from an object's ancestors. Only the symbols selected will appear in the browser.

The user can also select which symbols appear only in the current browser window. Within the browser window local menu can display the Local Browser Options dialog box. For instance, if one selects types, variables, and procedures as the type of symbols to view, and then browse through the Location object in a typical program, the following symbol information may be displayed:

(The abbreviations to the left of the listed symbols represent the kind of symbol displayed. Note that turning the procedure symbols off also turns functions off.)

| Symbol | Meaning |
| --- | --- |
| const | Constant |
| func | Function |
| label | Label |
| proc | Procedure |
| type | Type |
| var | Variable or a typed constant |

One may simply re-display the previous browser window (e.g., selecting Search!Previous Browser or pressing Ctrl+P).

When browsing a selected symbol, the browser window displays scope information by default. One can also display fully qualified identifiers. In a preferred embodiment, this feature may be toggled through a Qualified Symbols display option.

By default, the browser displays complete declaration information for the symbol being inspected. The user can view all fields and methods of records and objects, including fully qualified identifiers. If one does not want to see the identifiers fully qualified, however, the Qualified Symbols display option is toggled off. Also by default, the browser displays identifiers in the Scope pane in the order they are declared. Alternatively, all identifiers may appear in alphabetical When the browser displays reference information, one can choose to edit the program line displayed in a reference or track references to a symbol. Tracking means the Integrated Development Environment (IDE) highlights one program line after another in the source code as one moves through the references in the browser window. To edit the program line displayed in a reference, the user selects the reference in the browser window. The cursor jumps to the program line in the source code referenced in the browser window. The user can now edit the program line.

The present invention also includes a method for auto tracking source code. In particular, when one scrolls through references, program lines are highlighted in the source code automatically. How program lines referenced in a browser window are tracked can vary. Source Tracking options also affect the Messages window and the integrated debugger.

With a specific code module, just as with objects, one can view scope or reference information for a symbol. In operation, the user opens a window that displays the global symbols used in the program, listed in alphabetical order. By selecting (e.g., clicking) the symbol the user receive more information about that symbol. A Search input box is displayed at the bottom of the window to let the user quickly search through a list of global symbols by typing the first few letters of the symbol's name. As the user types, a highlight bar in the list box moves to a symbol that matches the typed characters.

Once the user selects the global symbol of interest, he or she can choose the browse button to see the declaration of the symbol; choose a Go To Source Code button to see how the symbol is declared in the source code; or choose a Reference button to see a list of references to the symbol. To go to the actual reference in the code, one selects (e.g., double-clicks) the reference in the reference list.

The user can also browse through all the object modules (e.g., Pascal units) a program uses. By selecting Search|Units, the user may open a window that lists all the units in a program and the application name itself. Next, the user selects the unit he or she wants more information about. As with global symbols, one can search through the unit list by typing the first few letters of the unit name in the Search input box at the bottom of the window.

Once the user has selected the unit, he can list all the symbols in the interface part of the unit as follows. In a displayed list of units, the user selects (e.g., double-clicks) the unit name and chooses Inspect to see the symbol's declaration. To go to the line in the source code where the symbol is declared, the user chooses the Go To Source Code button. To list all references to the symbol, the user chooses the Reference button. Upon selection of one of these references, the browser positions the cursor at that reference in the source code.

The user can also browse any symbol in the code without viewing object hierarchies or lists of symbols first. In an exemplary embodiment, the user chooses from one of three methods: (1) highlighting the symbol in the code and choose Search|Symbol; (2) selecting with a mouse (e.g., hold down the Ctrl key and click the symbol in the code with the right mouse button; or (3) click the right mouse button or press Alt+F10 to display the local edit window menu and choose Browse at Symbol.

If the symbol selected to browse is a structured type, the browser shows the user all the symbols in the scope of that type. The user can then choose to inspect any of these further. For example, if user selects an object type, he or she see all the symbols listed that are within the scope of the object.

As in the case of objects, one can open additional browser windows to view program line references to that symbol, the symbol's declarations, and, for objects, the inheritance hierarchy. When reference information is displayed, one can track or edit program lines. To browse a symbol in source code, the user places the cursor on the symbol and choose one of the following. He or she choose Symbol from the Search menu to display the Browse Symbol dialog box and accepts the symbol listed in the dialog box, or enter another symbol. He or she clicks the right mouse button (or keystroke, e.g., Alt+F10) to display an edit window local menu, and choose Browse Symbol at Cursor. Alternatively, one may set the right mouse button to browse symbols in response to holding down a key (e.g., Ctrl key) and clicking the right mouse button.

The type of information displayed depends on the type of information available for the symbol selected. If the symbol one has selected has no scope information available, the browser displays reference information for the symbol. For example, only reference information is available for a simple constant. If the symbol selected does have scope information available, the browser displays scope information for the symbol, with the option to see reference information.

If the symbol selected is a structured type, the browser displays scope information for the type and gives the user the options to see inheritance and reference information. If one selects to see the inheritance information, he or she will see the immediate ancestor of the type and immediate descendants, if any. If one selects a structured type to browse, the browser displays fully qualified names if one of two conditions are met: (1) an Inherited symbol option is checked in the Browser Options dialog box (Options|Browser) or in the Local Browser Options dialog box (browser window local menu|Options), and (2) a Qualified Symbols option is checked in the Browser Options dialog box (Options|Browser) or in the Local Browser Options dialog box (browser window local menu|Options).

C. User interface filtering

According to the present invention, one or more screen symbols, such as letters, graphics, glyphs, or other representative indicia, appear to the left of each symbol in an object. These describe the type of symbol being browsed. Using letters as screen symbols, for example as shown in FIG. 7A, the following type information is readily conveyed to the user.

| Letter | Symbol |
| --- | --- |
| F | Function |
| P | Procedure |
| T | Type |
| V | Variable |
| C | Constant |
| L | Label |
| I | Inherited from an ancestor |
| p | Private symbol |
| v | Virtual method |

More particularly, the present invention provides interface components for filtering or otherwise selectively displaying information based on user selection of these screen symbols. As shown in FIGS. 7C–F, for instance, the same letters that identify the kind of symbol appear in a Filters matrix at the bottom of the browser window. The user can apply filters to select the type of symbols he or she wants to see listed. Alternatively, the user can also use the options dialog box to select the type of symbols.

The Filters matrix has a column for each letter; the letter can appear in the top or bottom row of this column. To view all instances of a particular type of symbol, the user clicks the top cell of the letter's column. For example, to view all the variables in the currently selected object, the user clicks the top cell in the V column. All the variables used in the object appear.

Several filter settings can be changed at once. For instance, the user can drag the mouse cursor over the cells he or she wants to select in the Filters matrix. To hide all instances of a particular type of symbol, the bottom cell of the letter's column is clicked. For example, to view only the functions and procedures in an object, the user can hide all the variables by clicking the bottom cell in the V column, and clicking the top cells in the F and P columns.

In some cases more than one letter appears next to a symbol. The second letter appears just after the letter identifying the type of symbol and further describes the symbol, for instance:

I indicates an inherited symbol
p indicates a private symbol
v indicates a virtual symbol In an exemplary embodiment, to view the declaration of a particular listed symbol, the user does one of the following: (1) Double-clicks the symbol; (2) Selects the symbol and click the Browse button (press Ctrl+B); or (3) Selects the symbol and press Enter.

D. Preferred Methods

Figure 8A:
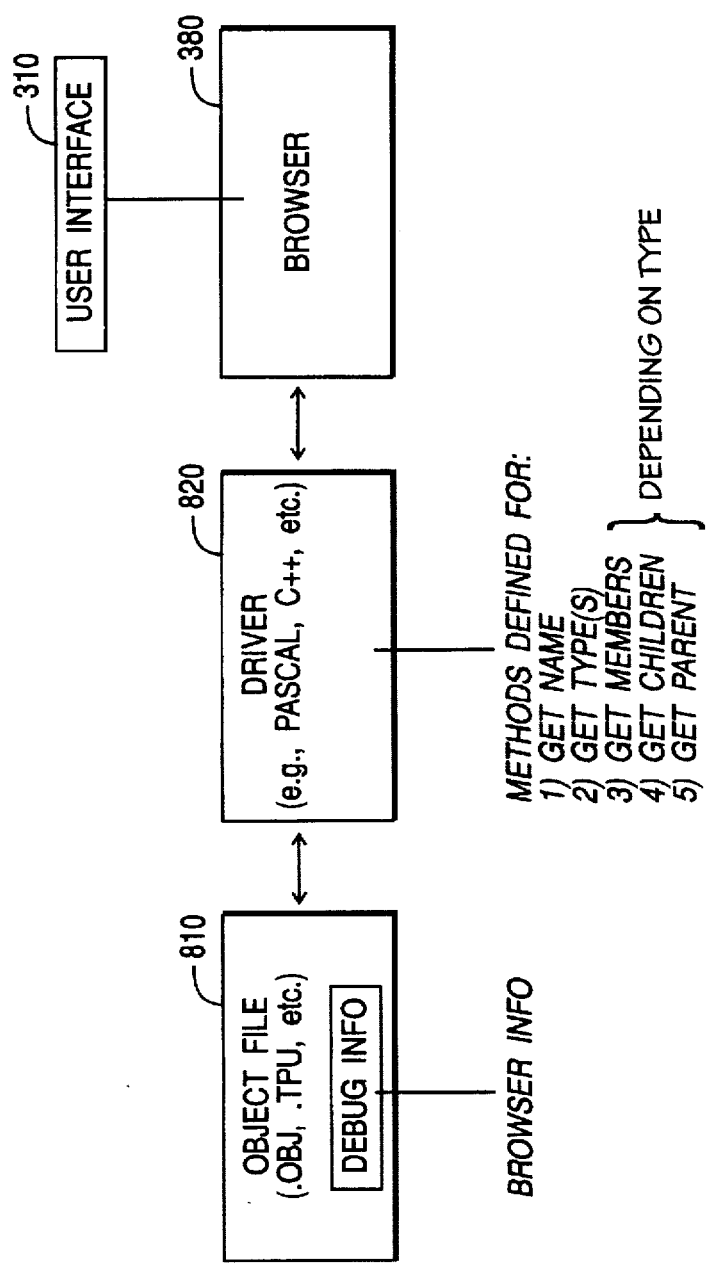
FIG. 8A is a block diagram illustrating the relationship between the browser of the present invention and object files (where browser information is stored).

The present invention provides all the necessary integrated debugging/browsing information needed to track or edit the source code where a code module (e.g., Pascal unit or C/C++ object module) is referenced. A general overview of this concept is represented by the block diagram of FIG. 8A. As shown, the browser 380, which is operably coupled to the interface 310, communicates with object files 810 (where browsing information is stored) through a driver 820. The driver 820 is specific for a particular target language (e.g., Pascal, C++, and the like). The driver includes methods for returning name, type, and member information for a particular symbol of interest. The method for this operation will now be described.

Figure 8B:
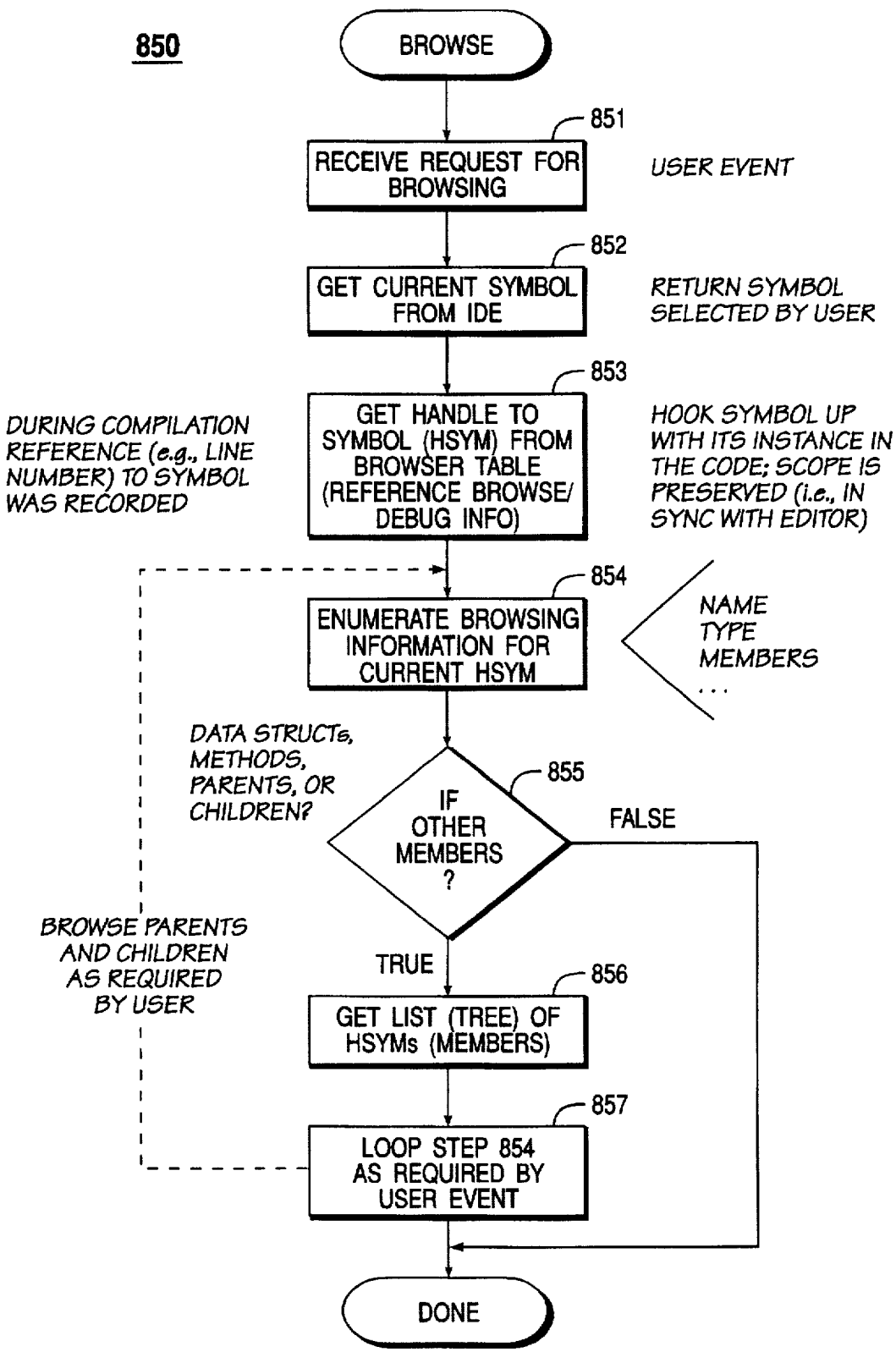
FIG. 8B is a flowchart illustrating a method of the present invention for browsing symbols.
Figure 8C:
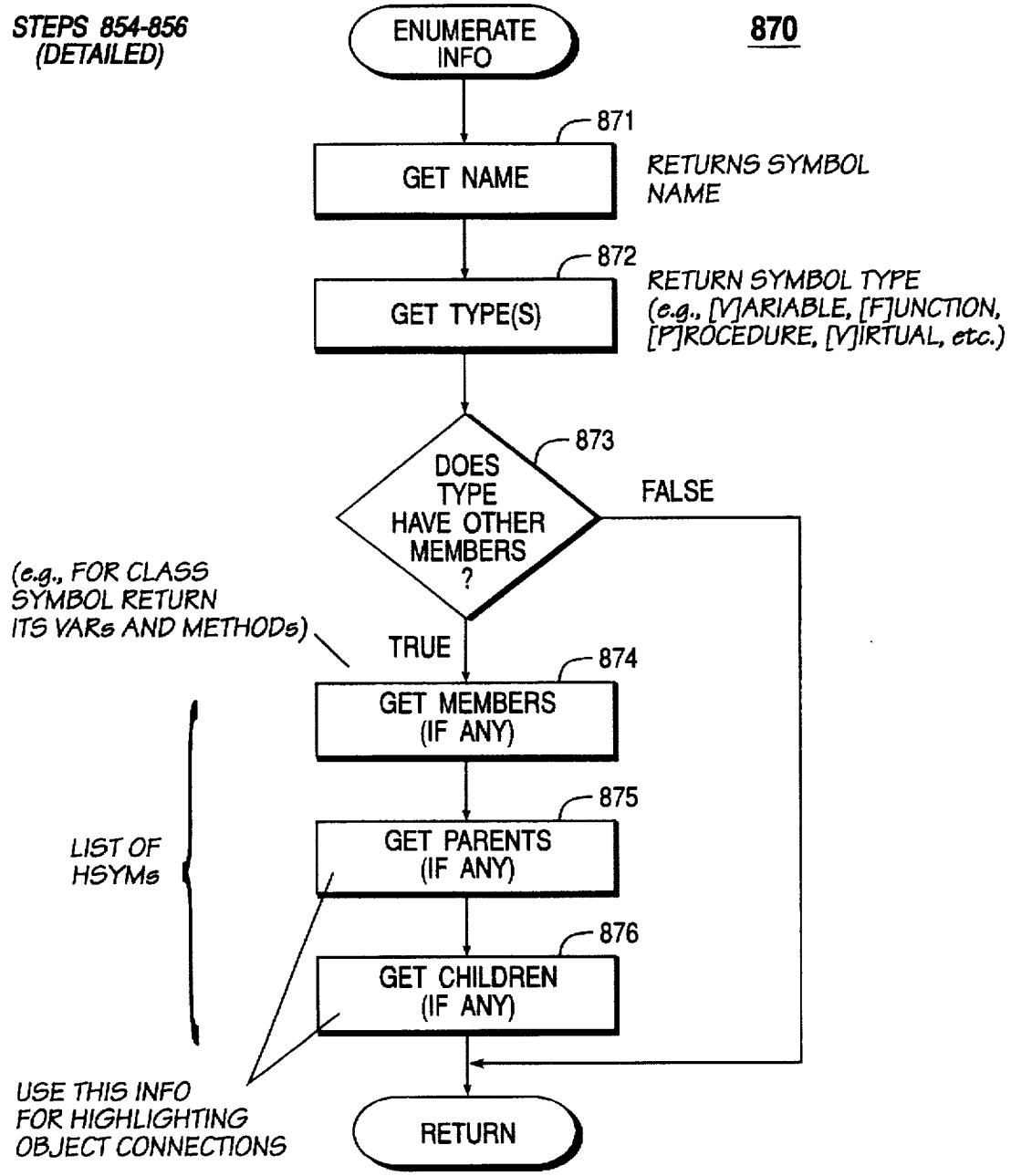
FIG. 8C is a flowchart illustrating a method of the present invention for enumerating browsing information of a symbol; this method is a subroutine of the method represented in FIG. 8B.

Referring now to FIGS. 8B–C, a method 850 of the present invention for browsing symbols in source listings will now be described. In step 851, a request is received from the user for browsing a symbol of interest. In step 852, the method retrieves the symbol which has been selected by the user, using known methodology (e.g., hit testing). In step 853, the symbol is "hooked up" with its instance in the code by retrieving a handle to the symbol (HSYM) from the browser table (stored in the object file). At step 854, browsing information for the current symbol (e.g., name, type, members, and the like) is enumerated. At step 855, if the current symbol includes other members (e.g., data structures, methods, parents, children, and the like), then the method proceeds to step 856 to enumerate these members as well (constructs a list, preferably a tree) of members (accessed through handles). At step 857, the method loops back to step 854 as required by the user (e.g., for browsing parent and children members). If additional members do not exist at step 855, however, then steps 856 and 857 are skipped. After these steps, the method concludes.

Referring now to FIG. 8C, steps 854–856 of FIG. 8B are shown in particular detail. A method 870 for enumerating information proceeds as follows. In step 871, the method gets the name (e.g., text string) for the current symbol being referenced. At step 872, the method gets at least one type information for the symbol (e.g., function, virtual, and the like). If the symbol is of a type which has additional members (e.g., symbol is a class) at step 873, then the method proceeds to steps 874–876 to enumerate these members. Specifically, at step 874, data structures (e.g., variables) and methods (e.g., procedures and functions) are enumerated. At step 875, any parents are enumerated, and at step 876, any children are enumerated. If the symbol type does not have additional members (e.g., type is "constant"), then steps 874–876 are skipped. At the conclusion of the subroutine, the method returns (back to method 850).

Figure 8D:
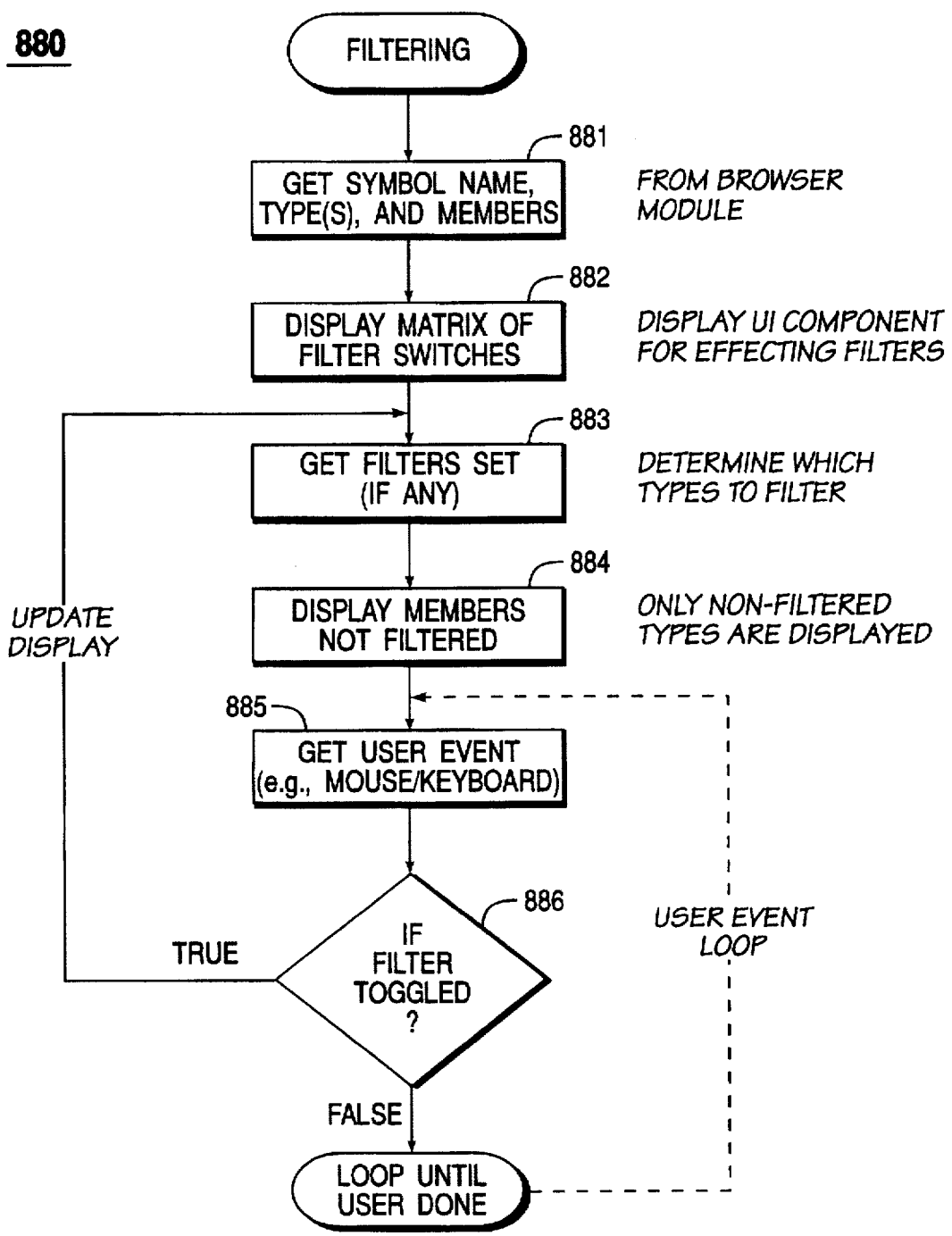
FIG. 8D is a method of the present invention for filtering the display of screen information.

Referring now to FIG. 8D, a method of the present invention for filtering the display of screen information is illustrated by a flowchart 880. At step 881, browser information (e.g., name, types, and members) for the current symbol is determined (as shown in FIGS. 8B–C). At step 882, the method displays a matrix of filter switches—a user interface component for effecting filters. At step 883, the method determines (from the matrix) which types are to be filtered (i.e., not displayed). At step 884, the method displays only those members of the list which are not to be filtered. At step 885, the next user event (e.g., mouse and/or keyboard event) is retrieved. At step 886, if the user has enabled or disabled filter settings, then the method returns to step 883 to update display of the list. If the filter matrix has not been changed (false at step 886), then the method loops back to step 885 to retrieve the next user event (until the user is done).

Appended herewith as Appendix A are exemplary user commands for operating the browser of the present invention. Those skilled in the are will appreciate other command syntaxes which are also suitable for use with the present invention. Specifically, the commands of Appendix A are offered for purposes of illustration, not limitation.

While the invention is described in some detail with specific reference to a single preferred embodiment and certain alternatives, there is no intent to limit the invention to that particular embodiment or those specific alternatives. For example, the foregoing description has focused on a preferred embodiment operative within the Microsoft Windows environment; those skilled in the art will appreciate, however, that the individual classes may be adapted for other platforms, including, for example, OS/2, NeXTStep, X-Windows, and the like. Moreover, the browsing methods of the present invention are not limited to any particular language but, instead, may be advantageously applied wherever browsing of symbols is desired. Thus, the true scope of the present invention is not limited to any one of the foregoing exemplary embodiments but is instead defined by the following claims.

APPENDIX A

Table lists exemplary keys and menu commands that activate specific browser functions.

| Task: | Preferred command: |
|---|---|
| Browse objects | Choose Search!Objects. |
| Browse units | Choose Search!Units. |
| Browse global symbols | Choose Search!Globals. |
| Browse Symbol | Place the cursor on the symbol in the code, choose Search!Symbol, or hold down Ctrl and click the right mouse button. |
| Select Browser Option | Choose Options!Browser. |
| Select Source Tracking | Choose Options!Environment!Options Preferences. |
| Select Mouse Options | Choose Options!Environment!Mouse. |
| Open a Previous browser | Choose Search!Previous Browser, choose Previous on the browser window local menu, or press Ctrl+P. |
| Select Local Browser | Press Ctrl+O, or choose Options on Options browser window local menu. |
| Edit source code | Press Ctrl+Enter, press Ctrl+G, or choose Goto Source on the browser window local menu. |
| Track source code | Press Spacebar from the Browser, press Ctrl+T, or choose Track Source on the browser window local menu. |
| Display reference info | Press Ctrl+R from the browser or |

APPENDIX A-continued

Table lists exemplary keys and menu commands that activate specific browser functions.

| Task: | Preferred command: |
|---|---|
| Display scope info | click the R in the window frame. Press Ctrl+S from the Browser, or click the S in the window frame. |
| Display inheritance info | Press Ctrl+I from the Browser, information or click the I in the window frame. |
| Reverse Sub-browsing setting | Hold down Shift while selecting the next browsing action. |

What is claimed is:

1. In a development system for compiling source listings into application and system programs, each of the source listings comprising a plurality of symbols for instructing operation of a program, a method for browsing symbols comprising:
- (a) compiling a source listing containing the symbols into a compiled program, said compiled program selectively storing symbol browsing information when browsing is desired by a user;
- (b) selecting a symbol of interest from a device displaying the source listing, said symbol being located at a particular location in the source listing and having a particular scope at that location;
- (c) receiving a request from the user for browsing the selected symbol of interest;
- (d) determining from the stored symbol browsing information, browsing information specific for the symbol of interest; and
- (e) displaying said browsing information to the user, so that browsing information with a scope appropriate for the selected symbol at the particular location is displayed.

2. The method of claim 1, wherein said source listings are selected ones of Pascal, C, C++, and assembler listings.

3. The method of claim 1, wherein said compiled program comprises an object file linked with other object and library files for creating an executable program.

4. The method of claim 1, wherein the symbol browsing information is stored in a browsing table in the compiled program.

5. The method of claim 1, wherein the symbol browsing information includes line number information specifying a position of the symbol in the source listing.

6. The method of claim 1, wherein said compiling step includes translating said symbols into machine instructions executable by a processor.

7. The method of claim 1, wherein said symbols are selected ones of program variables and functions.

8. The method of claim 1, wherein said symbols are selected ones of program classes, objects, and class methods.

9. The method of claim 1, wherein said information displayed to the user includes relationships between said classes.

10. The method of claim 1, wherein step (b) includes:
selecting a symbol of interest from the display device with a pointing device.

11. The method of claim 1, wherein the request from the user is generated by the pointing device.

12. The method of claim 1, wherein said request includes a right button signal generated by the pointing device.

13. The method of claim 1, wherein said information displayed to the user includes a name, at least one type, and related members of the symbol.

14. The method of claim 13, wherein said at least one type is a selected one of a variable and a function.

15. The method of claim 13, wherein said at least one type includes a class, and wherein said related members include superclasses and subclasses of the class.

* * * * *